US010632581B2

(12) United States Patent
Takeda

(10) Patent No.: US 10,632,581 B2
(45) Date of Patent: Apr. 28, 2020

(54) WORKPIECE CONVEYING APPARATUS FOR A PRESSING MACHINE

(71) Applicant: AIDA ENGINEERING, LTD., Kanagawa (JP)

(72) Inventor: Keisuke Takeda, Kanagawa (JP)

(73) Assignee: AIDA ENGINEERING, LTD., Kanagawa (JP)

(*) Notice: Subject to any disclaimer, the term of this patent is extended or adjusted under 35 U.S.C. 154(b) by 0 days.

(21) Appl. No.: 16/151,031

(22) Filed: Oct. 3, 2018

(65) Prior Publication Data

US 2019/0105745 A1 Apr. 11, 2019

(30) Foreign Application Priority Data

Oct. 6, 2017 (JP) .................................. 2017-195889

(51) Int. Cl.
*B23Q 7/04* (2006.01)
*B23Q 7/14* (2006.01)
(Continued)

(52) U.S. Cl.
CPC ............. *B23Q 7/043* (2013.01); *B21D 43/00* (2013.01); *B23Q 7/1405* (2013.01);
(Continued)

(58) Field of Classification Search
CPC ... F16C 41/005; F16L 3/00; F16L 3/01; F16L 3/015; B25J 17/0241; B25J 17/025;
(Continued)

(56) References Cited

U.S. PATENT DOCUMENTS 4,659,279 A * 4/1987 Akeel ................. B25J 19/0029
248/52
4,767,257 A * 8/1988 Kato .................... B25J 19/0025
285/190
(Continued)

FOREIGN PATENT DOCUMENTS

JP S60-14886 U 1/1985
JP S61-249295 A 11/1986
(Continued)

OTHER PUBLICATIONS

Extended Search Report in corresponding EP Application No. 18197559.0, dated Mar. 6, 2019.
(Continued)

*Primary Examiner* — William R Harp
(74) *Attorney, Agent, or Firm* — McDermott Will & Emery LLP

(57) ABSTRACT

A workpiece conveying apparatus for a pressing machine includes an arm unit including: a first arm; a second arm; a workpiece holding portion configured to hold a workpiece; a first arm drive mechanism; and a second arm drive mechanism. A pipe or the like arranged on an outer side of a second joint is supported at one side thereof by the first arm, and is supported at another side thereof by the second arm. When the first arm and the second arm are bent and stretched between a folded state and an extended state for workpiece conveyance, the pipe or the like is deformed utilizing a holding angle between the first arm and the second arm so that the pipe or the like is arranged so as to prevent swing of the pipe or the like about the second joint at the time of the workpiece conveyance.

12 Claims, 19 Drawing Sheets

(51) Int. Cl.
*B21D 43/00* (2006.01)
*B25J 9/04* (2006.01)
*B25J 9/00* (2006.01)
*B25J 19/00* (2006.01)

(52) U.S. Cl.
CPC .............. *B25J 9/0018* (2013.01); *B25J 9/042* (2013.01); *B25J 19/0025* (2013.01)

(58) Field of Classification Search
CPC ................ B25J 19/0025; B25J 19/0029; B25J 19/0033; B25J 19/0037; B25J 19/0041
See application file for complete search history.

(56) References Cited

U.S. PATENT DOCUMENTS

| | | | | |
|---|---|---|---|---|
| 4,864,888 | A * | 9/1989 | Iwata | B25J 17/0241 74/640 |
| 4,873,511 | A * | 10/1989 | Tanaka | B25J 19/0025 340/677 |
| 7,729,132 | B2 * | 6/2010 | Yamamoto | H02G 11/00 174/72 A |
| 9,346,173 | B2 * | 5/2016 | Asano | B25J 18/00 |
| 10,093,024 | B2 * | 10/2018 | Inoue | B25J 19/0025 |
| 10,166,683 | B2 * | 1/2019 | Takeda | B25J 9/0018 |
| 10,293,444 | B2 * | 5/2019 | Takeda | B25J 9/042 |
| 2003/0192390 | A1 | 10/2003 | Uematsu et al. | |
| 2005/0172606 | A1 * | 8/2005 | Wehler | B25J 19/0025 59/78.1 |
| 2016/0271678 | A1 * | 9/2016 | Yoshimoto | B21D 43/04 |
| 2017/0282381 | A1 * | 10/2017 | Inoue | B25J 19/0025 |

FOREIGN PATENT DOCUMENTS

| | | |
|---|---|---|
| JP | S61249295 A | 11/1986 |
| JP | 61-297096 A | 12/1986 |
| JP | S61-297096 A | 12/1986 |
| JP | S63191583 A | 8/1988 |
| JP | H0460692 U | 5/1992 |
| JP | 4241589 B2 | 3/2009 |
| JP | 2009-208080 A | 9/2009 |
| JP | 2009-208194 A | 9/2009 |
| JP | 2012000740 A | 1/2012 |

OTHER PUBLICATIONS

Decision of Refusal issued in corresponding Japanese Application No. 2017-195889, dated Oct. 25, 2019, with English translation.
Notice of Reasons for Refusal issued in corresponding Japanese Applicaton No. 2017-195889, dated Aug. 13, 2019.

* cited by examiner

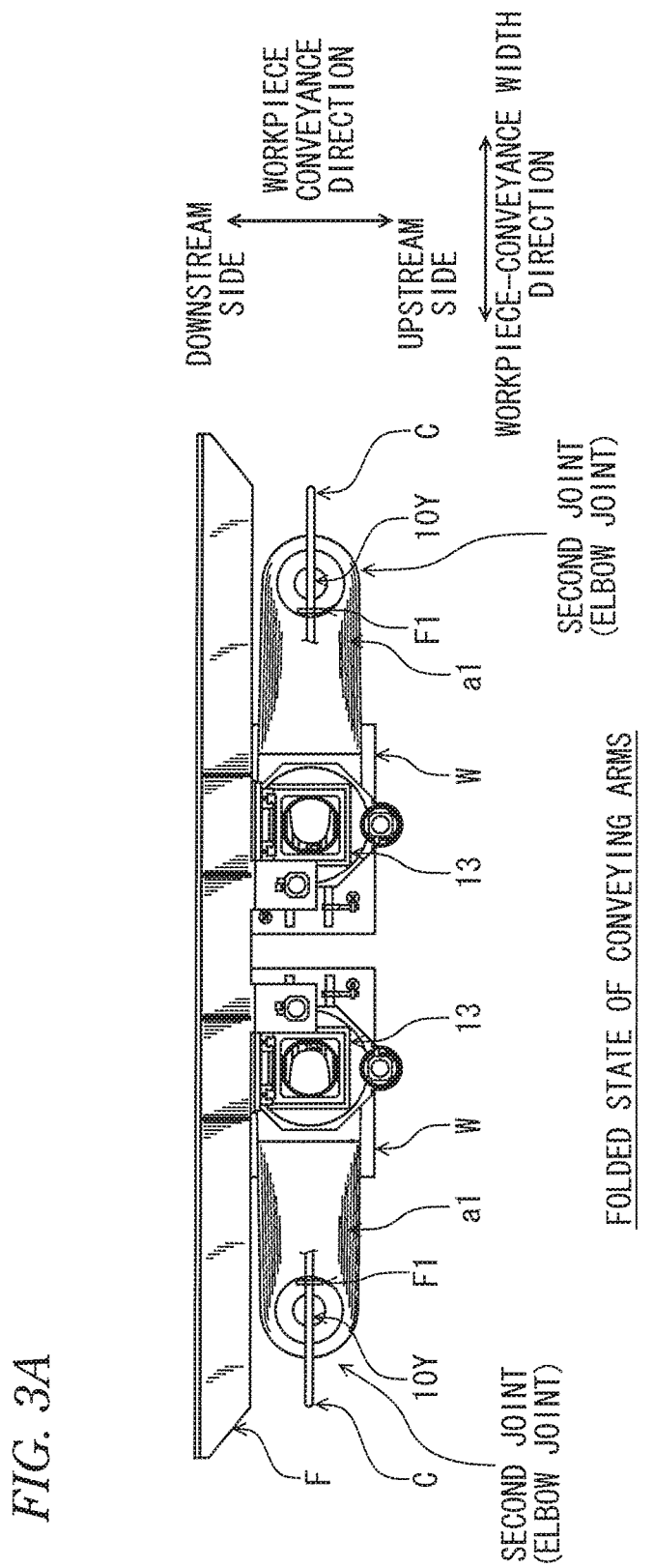

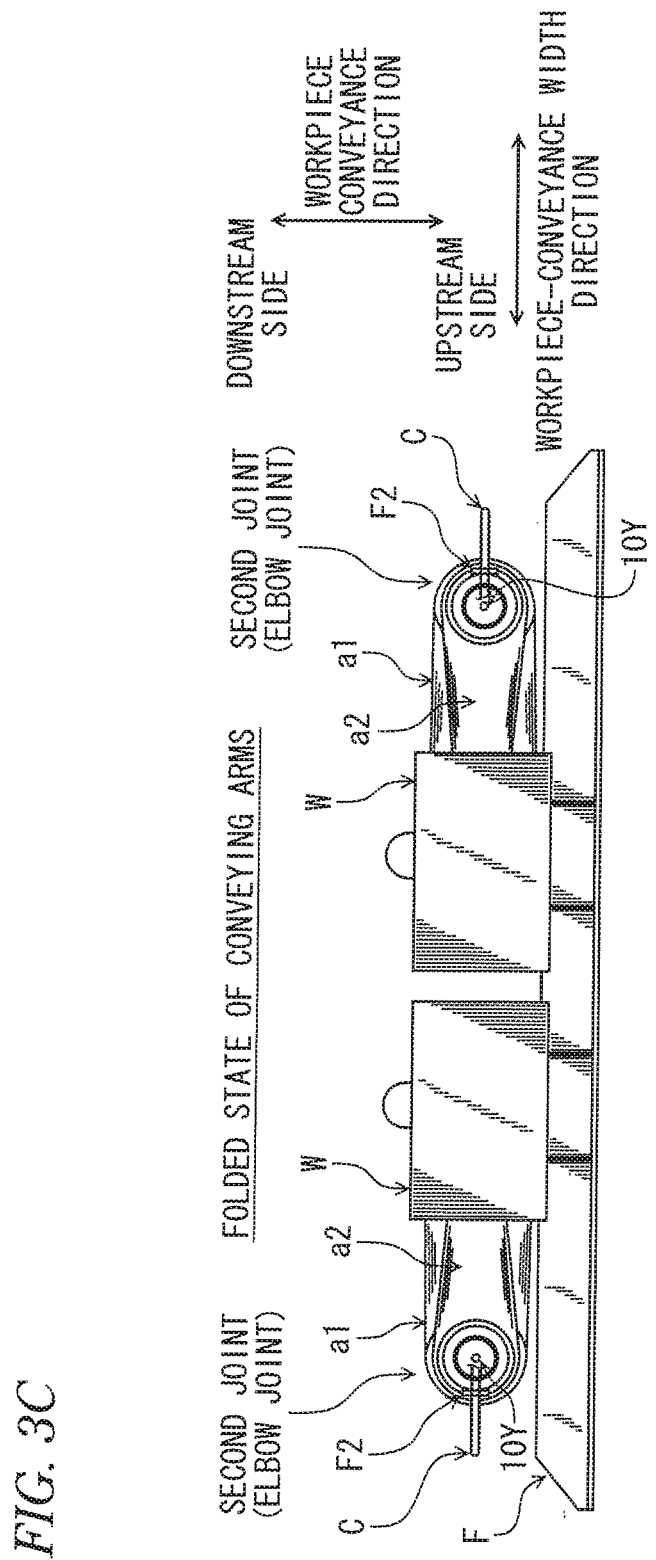

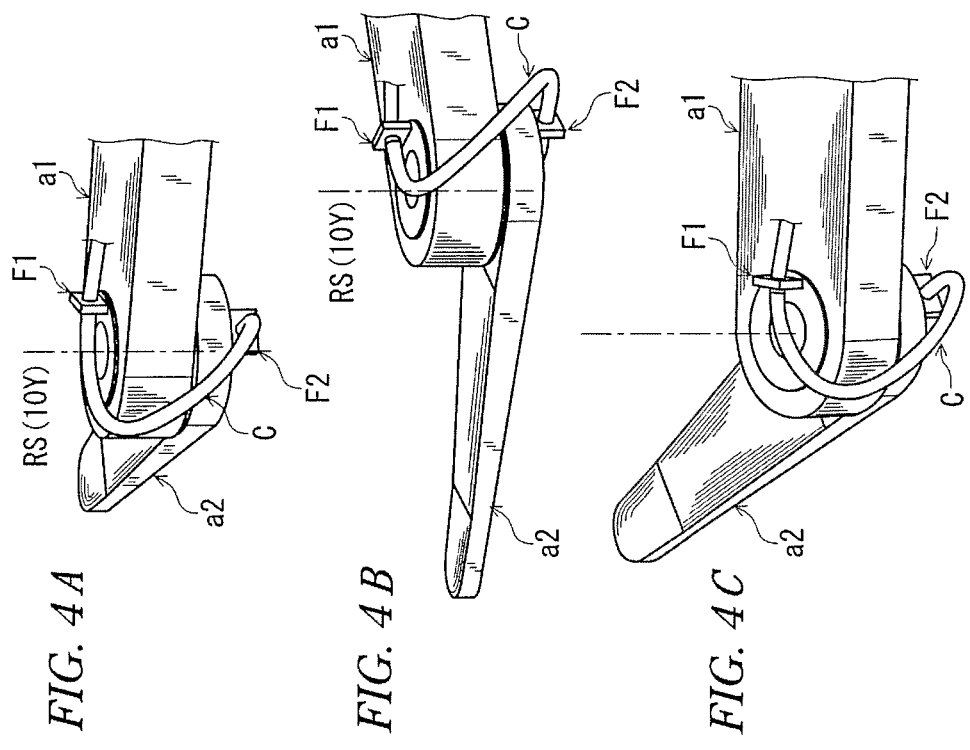

SUPPORT AT LATERAL SIDE OF a2

(UPPER SURFACE)

(LOWER SURFACE)

US 10,632,581 B2

WORKPIECE CONVEYING APPARATUS FOR A PRESSING MACHINE

BACKGROUND OF THE INVENTION

1. Field of the Invention

The present invention relates to a workpiece conveying apparatus for a pressing machine (press machine).

2. Description of the Related Art

Hitherto, there have been proposed various workpiece conveying apparatus configured to carry workpieces into and out of a press machine, or carry workpieces between the press machines.

For example, in Patent Literature 1, the following conveying apparatus for a workpiece is described. Specifically, as illustrated in FIG. 13, arm units of two SCARA (Selective Compliance Assembly Robot Arm) robots are controlled independently of one another, and distal ends of the arm units of the SCARA robots are coupled to each other by a slide arm.

In the workpiece conveying apparatus described in Patent Literature 1, in general, it is required to lay, from a proximal end side to a distal end side (workpiece holding side) of the arm unit, a power line for supplying electricity, a signal line for controlling power from each drive motor to control a posture of each arm unit, other electrical lines, or an air pipe in a case of using a suction pad as workpiece gripping means. The electrical line such as the power line or the signal line, the air pipe, or the like is hereinafter collectively referred to as "pipe or the like" (or "wiring or the like") in some cases. In Patent Literature 1, a power transmission mechanism in each arm unit is omitted.

Herein, Patent Literature 1 corresponds to Japanese Patent Application Laid-open No. 2009-208080.

Drive mechanisms (including a speed reducer) such as an upper arm and a front arm, a rotary shaft, and a bearing are provided inside joint parts (such as a shoulder joint and an elbow joint) of the arm unit. Thus, the above-mentioned pipe or the like cannot be caused to pass inside the joint part of the arm unit in some cases.

In view of the above, in order to prevent such a situation that excessive stress or the like acts on the pipe or the like when the arm unit (upper arm and front arm) is bent and stretched to cause breakage or the like, there is devised, for example, a mode in which a guide member having a U-shape that is swingable about the rotary shaft as a reference is provided at the joint part of the arm unit as illustrated in FIG. 14, and the pipe or the like is fixed along the guide member.

However, in the case of the mode described above, there is an actual circumstance that the pipe or the like swings together with the guide member due to acceleration (acceleration/deceleration) that is caused when the conveying apparatus performs a reciprocating motion between press machines. When the wiring or the like swings as described above, there is an actual circumstance that breakage of the pipe or the like is caused, and, at the same time, a risk of contact (interference) with upper and lower dies when the arm unit approaches the press machine is increased.

SUMMARY OF THE INVENTION

According to one embodiment of the present invention, there is provided a workpiece conveying apparatus for a pressing machine, including an arm unit including: a first arm supported at a proximal end side thereof through intermediation of a first joint so as to be freely rotatable within a substantially horizontal plane; a second arm supported at a proximal end side thereof on a distal end side of the first arm through intermediation of a second joint so as to be freely rotatable within the substantially horizontal plane; a workpiece holding portion, which is provided on a distal end side of the second arm, and is configured to hold a workpiece; a first arm drive mechanism configured to drive the first arm to rotate about the first joint; and a second arm drive mechanism configured to drive the second arm to rotate about the second joint with respect to the first arm, wherein one of a pipe and a wiring arranged on an outer side of the second joint is supported at one side thereof by the first arm, and is supported at another side thereof by the second arm, and wherein, when the first arm and the second arm are bent and stretched between a folded state and an extended state for workpiece conveyance, the one of the pipe and the wiring is deformed utilizing change in holding angle between the first arm and the second arm so that the one of the pipe and the wiring is arranged so as to prevent swing of the one of the pipe and the wiring about the second joint at the time of the workpiece conveyance.

According to one embodiment of the present invention, there is provided a workpiece conveying apparatus for a pressing machine, including an arm unit including: a first arm supported at a proximal end side thereof through intermediation of a first joint so as to be freely rotatable within a substantially horizontal plane; a second arm supported at a proximal end side thereof on a distal end side of the first arm through intermediation of a second joint so as to be freely rotatable within the substantially horizontal plane; a workpiece holding portion, which is provided on a distal end side of the second arm, and is configured to hold a workpiece; a first arm drive mechanism configured to drive the first arm to rotate about the first joint; and a second arm drive mechanism configured to drive the second arm to rotate about the second joint with respect to the first arm, wherein one of a pipe and a wiring arranged on an outer side of the second joint is supported at one side thereof by the first arm through intermediation of a first support portion, and is supported at another side thereof by the second arm through intermediation of a second support portion, wherein the first support portion and the second support portion are different from each other in shortest distance to the second joint, and wherein, as a holding angle between the first arm and the second arm is increased, the one of the pipe and the wiring is deformed so as to form a part of a helical shape.

According to one embodiment of the present invention, there is provided a workpiece conveying apparatus for a pressing machine, including an arm unit including: a first arm supported at a proximal end side thereof through intermediation of a first joint so as to be freely rotatable within a substantially horizontal plane; a second arm supported at a proximal end side thereof on a distal end side of the first arm through intermediation of a second joint so as to be freely rotatable within the substantial horizontal plane; a workpiece holding portion, which is provided on a distal end side of the second arm, and is configured to hold a workpiece; a first arm drive mechanism configured to drive the first arm to rotate about the first joint; and a second arm drive mechanism configured to drive the second arm to rotate about the second joint with respect to the first arm, wherein one of a pipe and a wiring arranged on an outer side of the second joint is supported at one side thereof by the first arm through intermediation of a first support portion, and is supported at another side thereof by the second arm through intermediation of a second support portion, wherein, in a case in which the one of the pipe and the wiring is extended from at least one of the first support portion and the second support portion to another of the first support portion and the second support portion, in a folded state in which the first arm and the second arm are folded so as to overlap each other, the one of the pipe and the wiring is arranged so as to intersect a vertical plane, which includes a rotary shaft of the second joint and is orthogonal to an extending direction of a center line of the first arm in a longitudinal direction in the folded state, and wherein the one of the pipe and the wiring is arranged so that the one of the pipe and the wiring is deformed into an arc shape as viewed in a direction along the rotary shaft of the second joint when the first arm and the second arm are extended in a workpiece conveyance direction.

According to one embodiment of the present invention, there is provided a workpiece conveying apparatus for a pressing machine, including an arm unit including: a first arm supported at a proximal end side thereof through intermediation of a first joint so as to be freely rotatable within a substantially horizontal plane; a second arm supported at a proximal end side thereof on a distal end side of the first arm through intermediation of a second joint so as to be freely rotatable within the substantially horizontal plane; a workpiece holding portion, which is provided on a distal end side of the second arm, and is configured to hold a workpiece; a first arm drive mechanism configured to drive the first arm to rotate about the first joint; and a second arm drive mechanism configured to drive the second arm to rotate about the second joint with respect to the first arm, wherein one of a pipe and a wiring arranged on an outer side of the second joint is supported at one side thereof by the first arm through intermediation of a first support portion, and is supported at another side thereof by the second arm through intermediation of a second support portion, wherein, in a case in which the one of the pipe and the wiring is extended from at least one of the first support portion and the second support portion to another of the first support portion and the second support portion, when a center axis of the first arm in a longitudinal direction intersects a center axis of the second arm in the longitudinal direction; a first extension starting direction of the one of the pipe and the wiring at the first support portion and a second extension starting direction of the one of the pipe and the wiring at the second support portion intersect each other, and wherein the one of the pipe and the wiring is arranged so that the first extension starting direction and the second extension starting direction of the one of the pipe and the wiring are different from each other when the first arm and the second arm are extended in a workpiece conveyance direction so as to form a helical shape in the one of the pipe and the wiring.

According to one embodiment of the present invention, with respect to a reference line R that passes through the first support portion and is substantially parallel to a longitudinal direction of the first arm, the second support portion may be located on a side opposite to a side on which the second arm is bent with respect to the first arm.

According to one embodiment of the present invention, the first support portion may be arranged so as to be located on a turn shaft side of the first joint on the proximal end side of the first arm with respect to the rotary shaft of the second joint coupling the first arm and the second arm.

According to one embodiment of the present invention, the second support portion may be arranged so as to be located on a side opposite to the workpiece holding portion with respect to the rotary shaft of the second joint coupling the first arm and the second arm.

BRIEF DESCRIPTION OF THE DRAWINGS

FIG. 3A is a plan view (top view) of the workpiece conveying apparatus according to the embodiment in a folded state of the conveying arms.

FIG. 3C is a lower view (bottom view) of FIG. 3A.

FIG. 4A is an enlarged perspective view for illustrating the details of a joint part (second joint, elbow joint) of a first arm (upper arm) and a second arm (front arm) of the workpiece conveying apparatus according to the embodiment.

FIG. 4B is a perspective view as viewed from another angle.

FIG. 4C is a perspective view as viewed from further another angle.

FIG. 4D is a view as viewed from a direction indicated by the arrow A of FIG. 4B (VIEW A).

DESCRIPTION OF THE EMBODIMENTS

Now, with reference to the accompanying drawings, description is made of an example of a workpiece conveying apparatus for a pressing machine according to an embodiment of the present invention. The present invention is not limited to the embodiment described below.

The present invention has been made in view of the above-mentioned circumstances, and one object thereof is to provide a workpiece conveying apparatus for a pressing machine including arm units (first arm (upper arm) and second arm (front arm)) each being swingable within a substantially horizontal plane, which is capable of preventing occurrence of breakage or the like of the pipe or the like in a joint part (elbow joint) with a relatively simple and low-cost configuration, and hence is low in cost and highly reliable.

Now, a configuration example of a workpiece conveying apparatus for a pressing machine according to this embodiment is described.

Figure 1:
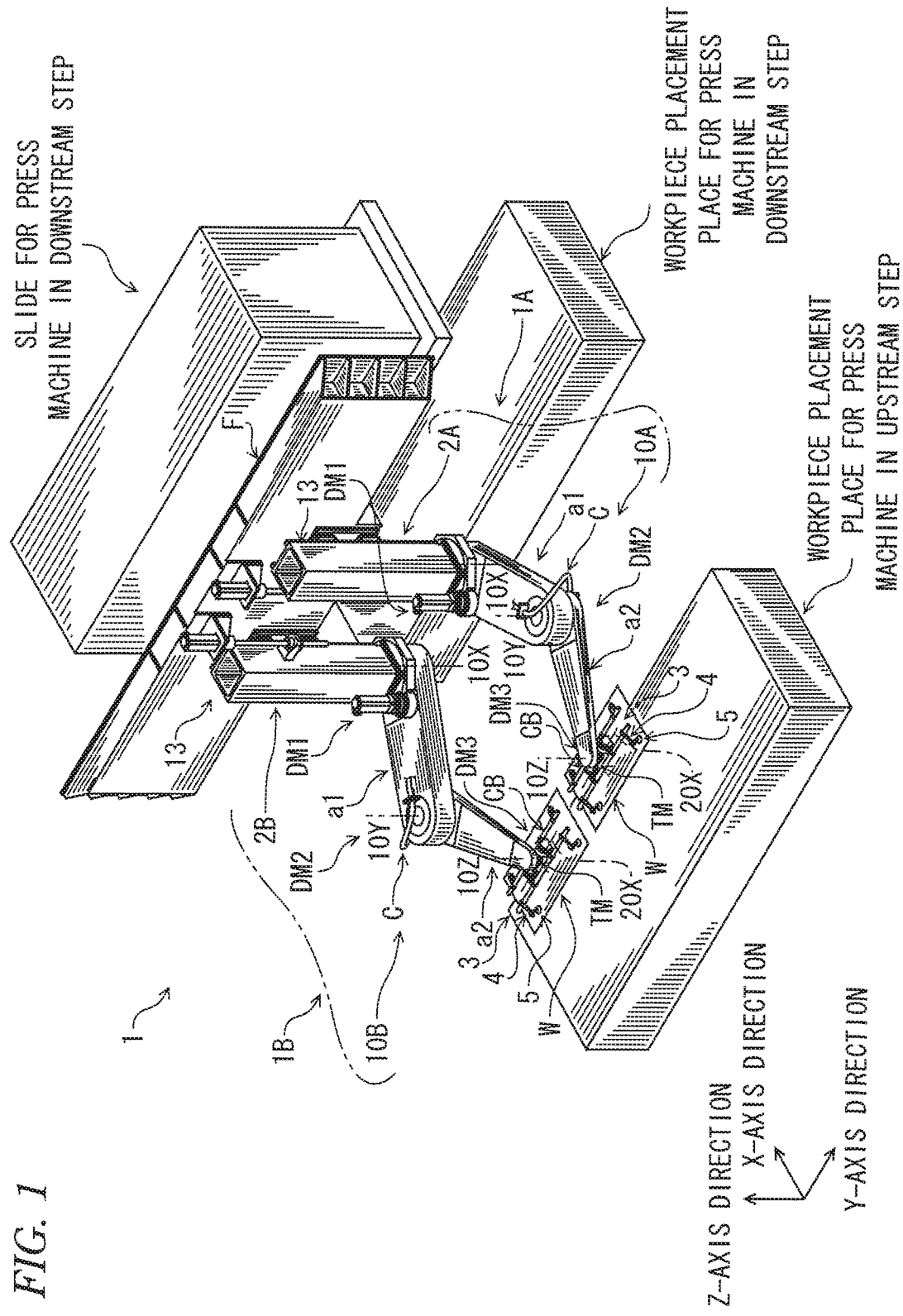
FIG. 1 is a perspective view for illustrating an overall configuration of a workpiece conveying apparatus according to one embodiment of the present invention.
Figure 2A:
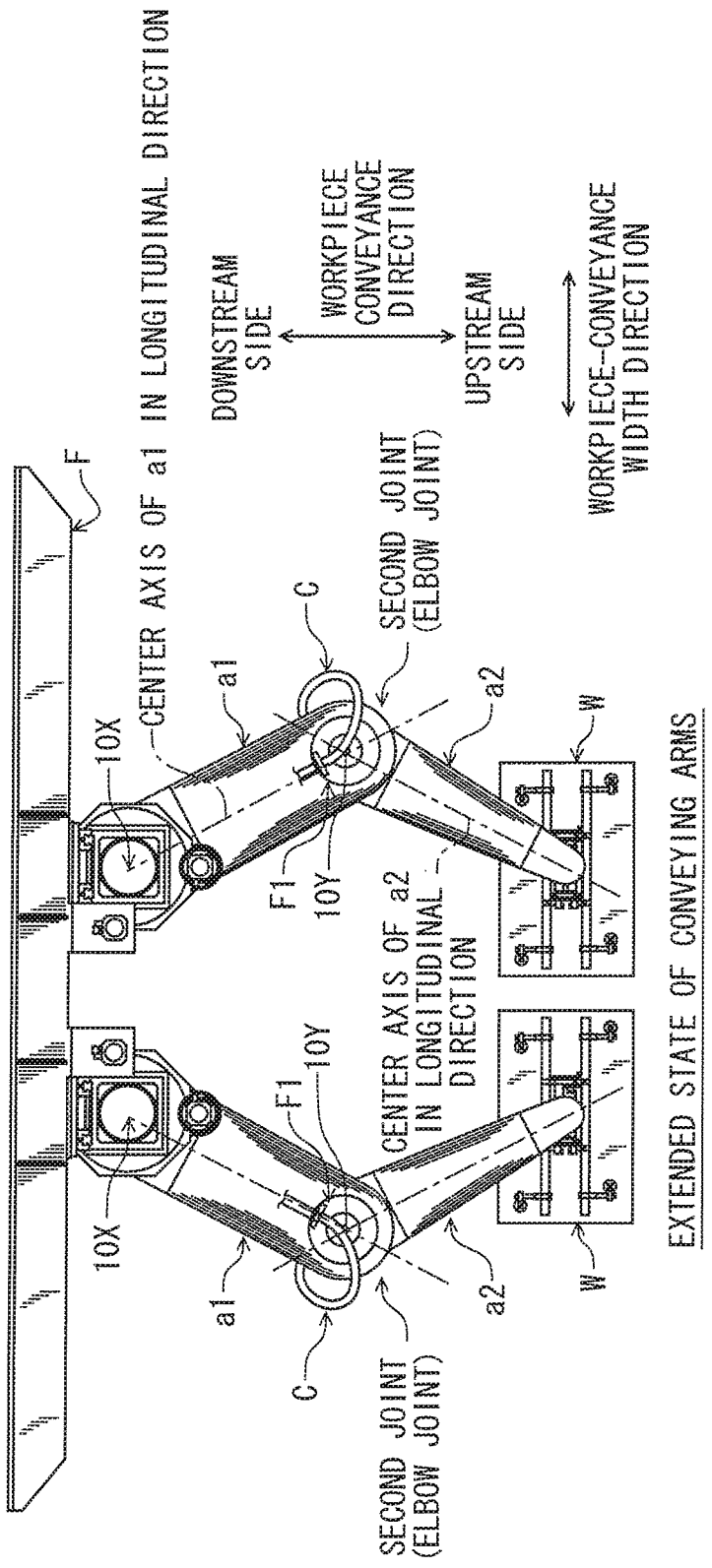
FIG. 2A is a plan view (top view) of the workpiece conveying apparatus according to the embodiment in an extended state of conveying arms.
Figure 2B:
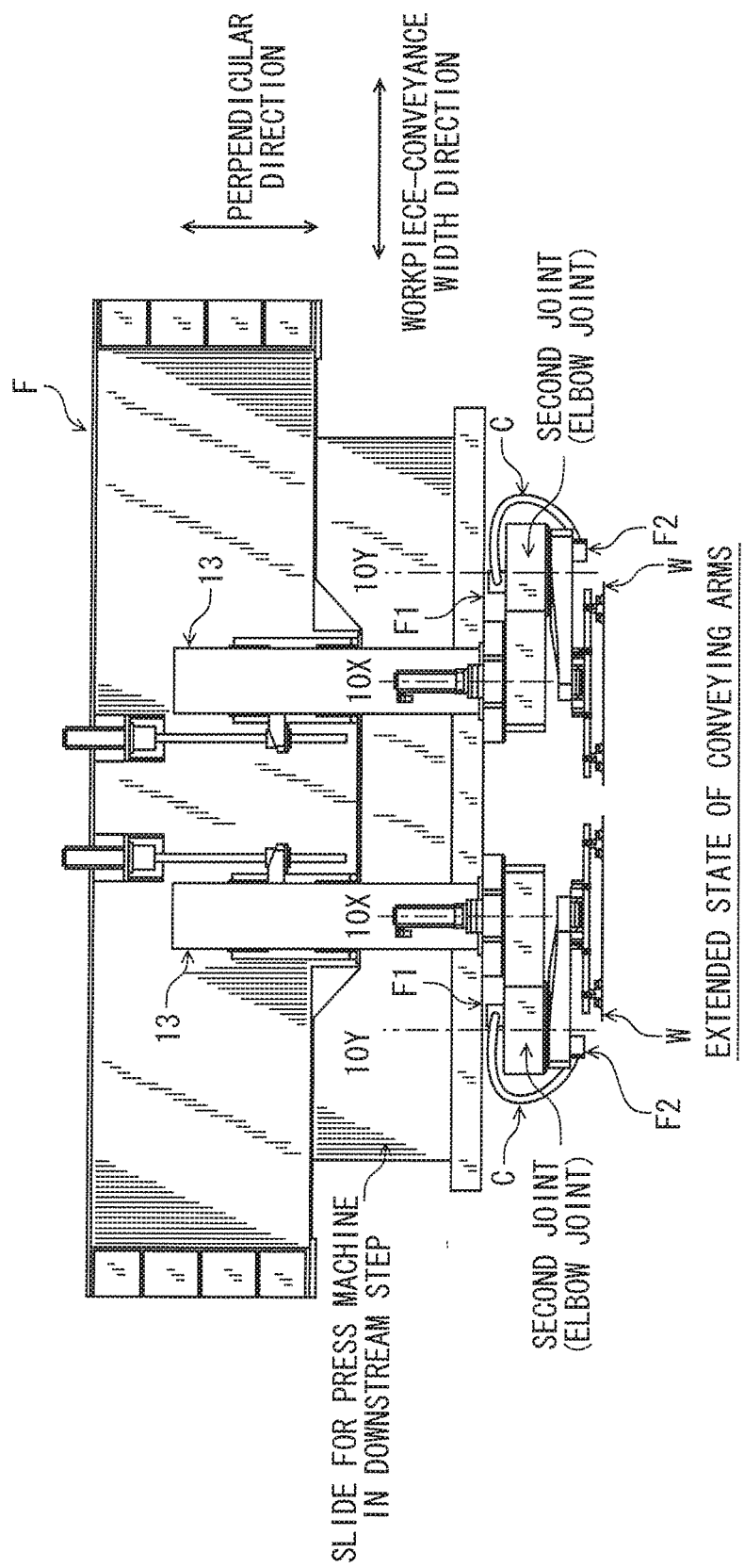
FIG. 2B is a front view of FIG. 2A (view as viewed from an upstream side in a workpiece conveyance direction).
Figure 2C:
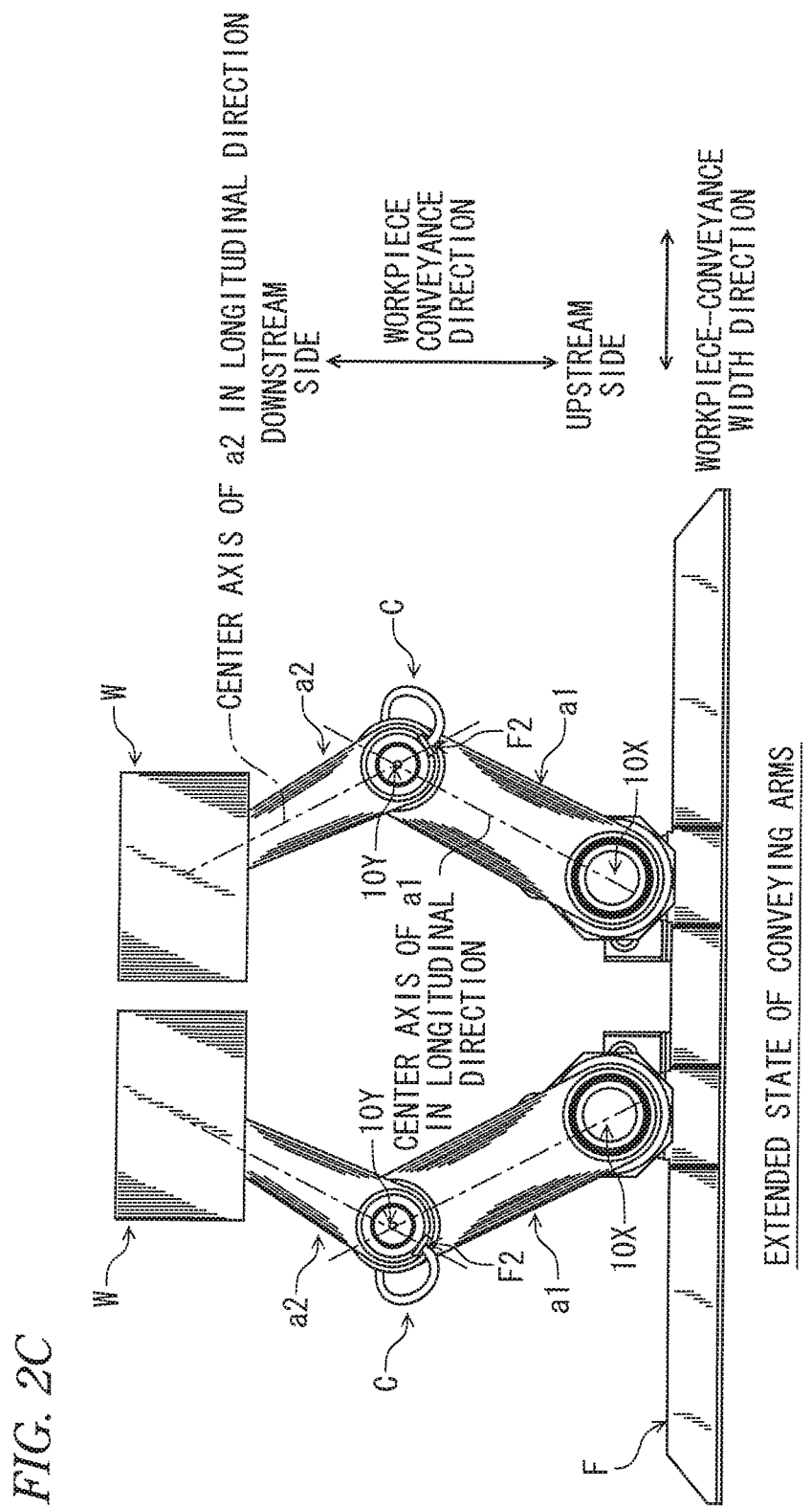
FIG. 2C is a lower view (bottom view) of FIG. 2A.

FIG. 1 is a perspective view of the workpiece conveying apparatus according to this embodiment. FIG. 2A to FIG. 2C are a top view (plan view), a front view, and a lower view for illustrating second arms and workpiece holding devices of the workpiece conveying apparatus according to this embodiment.

As illustrated in FIG. 1 to FIG. 3, a workpiece conveying apparatus 1 for a pressing machine according to this embodiment may include:

two SCARA robots (robots) 1A and 1B, which respectively include arm units 10A and 10B each including two arms (a first arm a1 (upper arm) and a second arm a2 (front arm); those arms are also referred to as "conveying arms"), the two SCARA robots (robots) 1A and 1B being supported on a stationary frame F so as to be movable in an up-and-down direction (a vertical direction or a Z-axis direction), the stationary frame F being stationarily installed to a press line (press machine) or the like along a width direction (a workpiece-conveyance width direction or a Y-axis direction) of a workpiece conveyance direction (X-axis direction);

raising and lowering mechanisms 2A and 2B, which are configured to raise and lower the two SCARA robots 1A and 1B with respect to the stationary frame F, respectively and independently of each other, that is, mutually independently; and workpiece holding devices 3, which are supported on distal ends of the second arms a2 of the two arm units 10A and 10B, respectively.

However, the workpiece conveying apparatus according to the present invention may include only one SCARA robot. Further, a configuration without the raising and lowering mechanisms (2A and 2B) may also be adopted.

The workpiece holding devices 3 may each be capable of holding and releasing the workpiece W by a drawing device 5 (workpiece holding device utilizing magnetic attraction or vacuum (or negative pressure) suction by a suction cup or the like) supported on the leg portions 4 mounted to a cross bar CB.

The raising and lowering mechanism 2A (2B), which is configured to raise and lower the SCARA robot 1A (1B), that is, to move the SCARA robot 1A (1B) in the Z-axis direction, includes an electric motor (such as servomotor), a ball screw, a ball screw nut (screw), a linear guide rail and the like. The SCARA robot 1A (1B) is connected to the ball screw nut through intermediation of a raising and lowering frame 13 that is raised and lowered (or moved up and down) along the ball screw arranged substantially upright, that is, arranged to extend in the Z-axis direction.

The ball screw is rotated in a predetermined manner (or in an opposite direction) by a driving force of the electric motor so that the SCARA robot 1A (1B) can be raised in an upward direction or lowered in a downward direction (Z-axis direction).

Here, the two robots 1A and 1B include the corresponding arm units 10A and 10B, respectively. The arm unit 10A (10B) includes:

the first arm a1 (upper arm), which is supported on the raising and lowering frame 13 through intermediation of a first joint 10X (a substantially perpendicular axis, a Z-axis, or a shoulder portion) so as to be freely rotatable within a substantially horizontal plane (XY plane); and the second arm a2 (front arm), which is supported on a distal end of the first arm a1 through intermediation of a second joint 10Y (a substantially perpendicular axis, a Z-axis, or an elbow joint) so as to be freely rotatable (the term "rotatable" hereinafter also encompasses "turnable" and "pivotable") within the substantially horizontal plane (XY plane);

the workpiece holding device 3 (cross bar CB), which is coupled to the distal end of the second arm a2 of the arm unit 10A (10B) through intermediation of a third joint 10Z so as to be freely rotatable within the substantially horizontal plane (XY plane);

a first arm drive mechanism DM1 (electric motor, and a speed reducer as needed), which is configured to drive the first arm a1 to rotate (swivel) about the first joint 10X with respect to the raising and lowering frame 13;

a second arm drive mechanism DM2 (electric motor, and a speed reducer as needed), which is configured to drive the second arm a2 to rotate (swivel) about the second joint 10Y with respect to first arm a1; and a workpiece holding device swivel (rotation) drive mechanism DM3, which is configured to drive the workpiece holding device 3 to rotate (swivel) about the third joint 10Z with respect to the distal end of the second arm a2.

The arm units 10A and 10B of the two robots 1A and 1B having such configuration are driven and controlled independently of each other. For example, the first arm a1 and the second arm a2 are rotated about respective joints by the first arm drive mechanism DM1 and the second arm drive mechanism DM2. Through such control, the two workpieces W can be moved independently of each other in the workpiece conveyance direction (X-axis direction). Further, the arm units 10A and 10B perform a reciprocating motion between one side and another side of the stationary frame F, with the stationary frame F as a reference, so as to repeatedly perform conveyance of a workpiece.

The workpiece holding device 3 is caused to rotate (swivel) about the third joint 10Z with respect to the second arm a2 by the workpiece holding device swivel drive mechanism DM3. In this manner, postures of the two workpieces W within a horizontal plane during conveyance can be controlled independently of each other.

Further, in this embodiment, a tilt drive mechanism TM is provided between the distal end of the second arm a2 and the workpiece holding device 3 (drawing device 5).

The tilt drive mechanism TM is configured to be capable of relatively rotating the workpiece holding device 3 (drawing device 5) as well as the workpiece W supported thereby about a fourth joint 20X with respect to the second arm a2 by the electric motor and the speed reducer provided as needed.

In the workpiece conveying apparatus 1 (robots 1A and 1B) for a pressing machine according to this embodiment, under the state illustrated in FIG. 1 and FIG. 2A to FIG. 2C (for example, an initial state: an extended state of the arm units), the robots 1A and 1B are raised and lowered respectively and independently of each other with respect to the stationary frame F by the raising and lowering mechanisms 2A and 2B. In this manner, the workpieces W on a die (bed), the workpieces W in a workpiece placement place, or the workpieces W on the conveyor belt (workpieces W arranged in parallel to each other in the workpiece conveyance direction) on an upstream step side can be drawn and supported by the drawing devices 5.

Now, with reference to enlarged views of FIG. 4A to FIG. 4D, FIG. 5A, and FIG. 5B, a configuration example of a second joint part of the first arm (upper arm) a1 and the second arm (front arm) a2 in this embodiment is described in detail below.

The first arm a1 and the second arm a2 have a relationship of being rotatable with a rotary shaft or axis (second joint 10Y, elbow joint) as a reference. In other words, the first arm a1 and the second arm a2 are coupled to each other so as to be freely rotatable (swingable) relatively about a rotary shaft (or axis) RS (the term "rotary shaft RS" hereinafter also encompasses the second joint 10Y) being a swinging center of the second joint part.

As illustrated in FIG. 4A to FIG. 4D, FIG. 5A, and FIG. 5B, on an upper surface of the first arm a1, there is mounted a first support portion (thy term "first support portion" hereinafter also encompasses a fixing portion) F1 configured to support (for example, fix) a pipe or the like (the term "pipe or the like" hereinafter also encompasses a wiring or the like) C extracted from an inside of the first arm a1 or the like. As the first support portion F1, there may be employed such a general configuration that the wiring or the like C is clamped by a method of fastening an outer periphery of the wiring or the like C in a state in which the pipe or the like C is inserted. However, the first support portion F1 is not limited to this configuration.

Further, the present invention is not limited to the case of performing completely clamping, and another configuration may be included in the scope of the present invention as long as the configuration is capable of restricting, to a predetermined degree, the pipe or the like C from moving in a longitudinal direction or a direction perpendicular to the longitudinal direction due to frictional resistance or the like, and, further, from rotating about a center axis of the pipe or the like C in the longitudinal direction (in a rotation direction) in a predetermined manner.

Further, on a lower surface of the second arm a2, there is mounted a second support portion (fixing portion) F2 having a configuration similar to that of the first support portion F1.

In this embodiment, as illustrated in FIG. 3A to FIG. 3C, FIG. 4A to FIG. 4D, FIG. 5A, FIG. 5B, or other drawings, the pipe or the like C is fixed at the first support portion F1 of the first arm a1, and then, is changed in direction to a lower side while forming a loop on an outer side of the second joint 10Y. Further, the pipe or the like C is fixed to the second arm a2 at the second support portion F2, and a distal end side thereof passes through an inside or a lower surface of the second arm a2 to be guided toward a third joint 10Z.

Figure 3B:
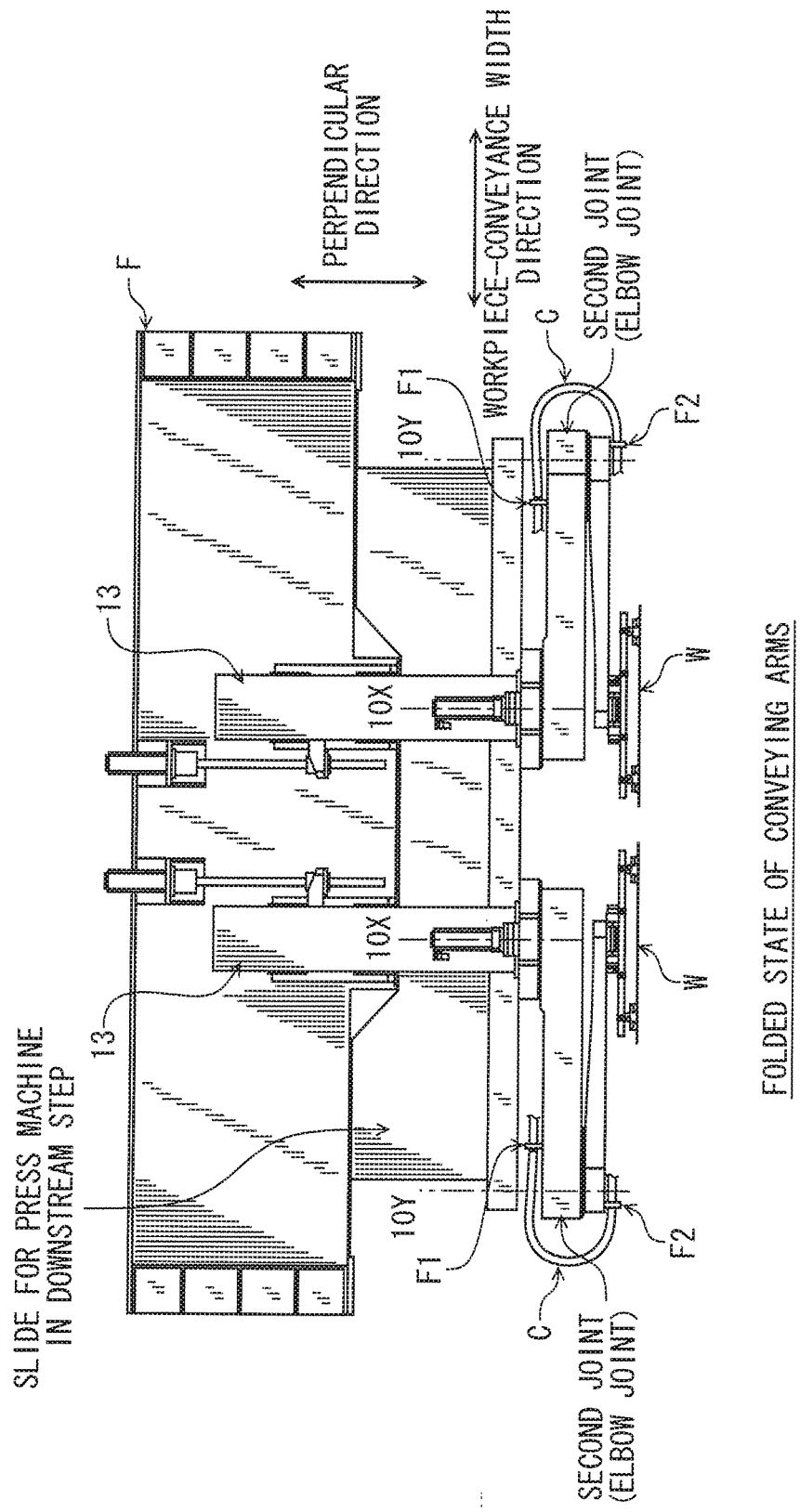
FIG. 3B is a front view of FIG. 3A (view as viewed from the upstream side in the workpiece conveyance direction).
Figures 5A, 5B:
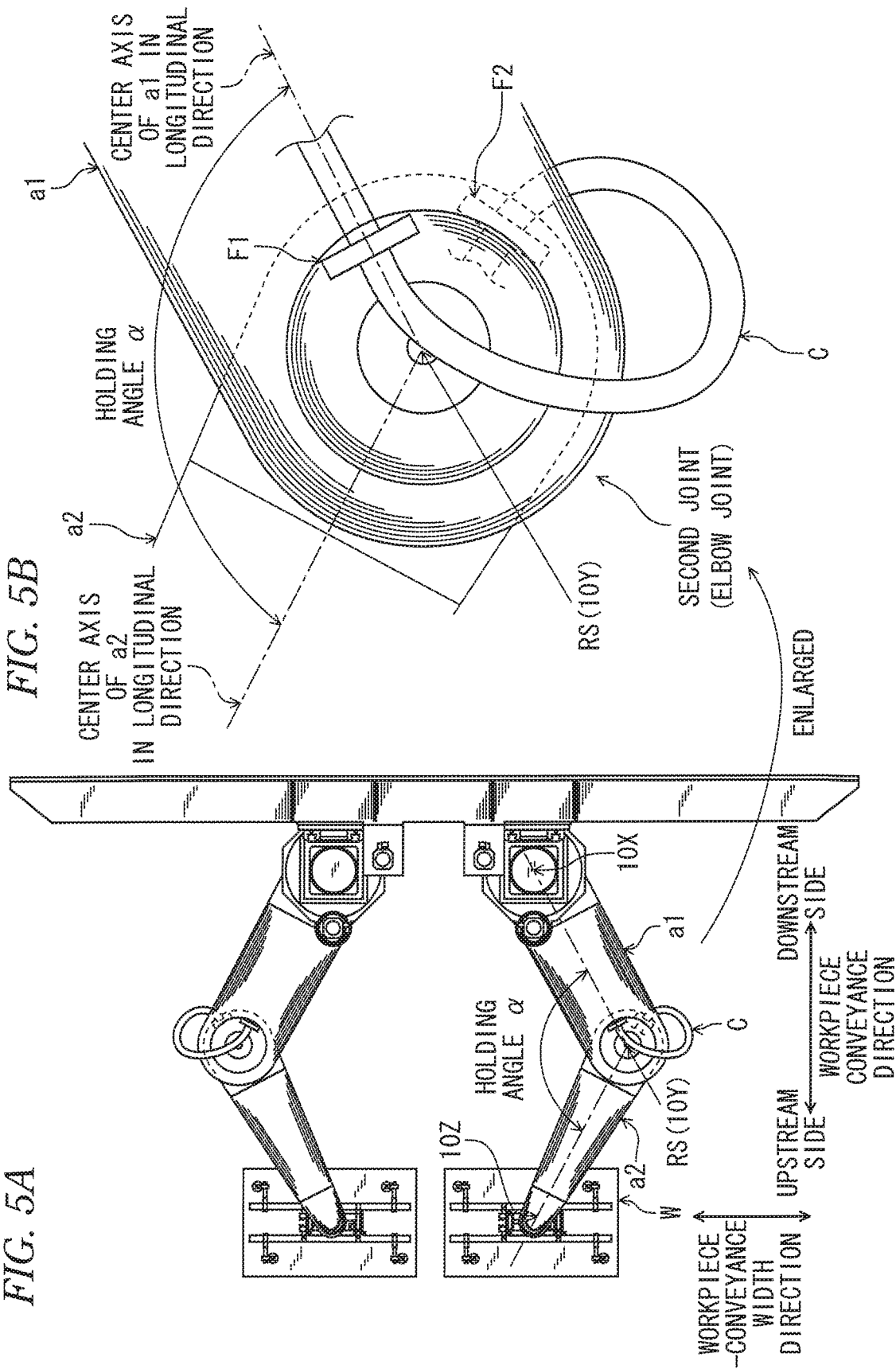
FIG. 5A is a plan view for illustrating the details of the joint part (second joint, elbow joint) of the first arm (upper arm) and the second arm (front arm) in the extended state of the workpiece conveying apparatus according to the embodiment.
FIG. 5B is an enlarged view of FIG. 5A.

That is, in this embodiment, the pipe or the like C is not fixed between the first support portion F1 and the second support portion F2, and, in a folded state of the conveying arms in FIG. 3A to FIG. 3C, is arranged in an arc shape so as to form a loop on the outer side of the second joint 10Y as viewed in the workpiece conveyance direction. The folded state of the conveying arms herein corresponds to a state in which the first arm a1 and the second arm a2 are overlapped with each other as viewed in a perpendicular direction. Further, the pipe or the like C maintains a posture of starting extension toward the rotary shaft RS along a longitudinal direction of the first arm a1 at the first support portion F1, and maintains a posture of stating extension so as to be apart from the rotary shaft RS along a longitudinal direction of the second arm a2 at the second support portion F2.

A center axis of the first arm a1 in the longitudinal direction corresponds to a line connecting the first joint 10X and the second joint 10Y, and a center axis of the second arm a2 in the longitudinal direction corresponds to a line connecting the second joint 10Y and the third joint 10Z.

Further, the pipe or the like C may be inserted into a pipe having a cylindrical shape or the like between the first support portion F1 and the second support portion F2, or, in a case in which a plurality of wirings are provided, the wirings may be bundled as they are by, for example, a banding band. That is, as long as the pipe or the like C is not fixed between the first support portion F1 and the second support portion F2 by another member, and has a predetermined rigidity so as form a loop on the outer side of the second joint 10Y, there is no particular limitation on the number, various dimensions, a shape, and a material of the pipe or the like C.

Figure 6:
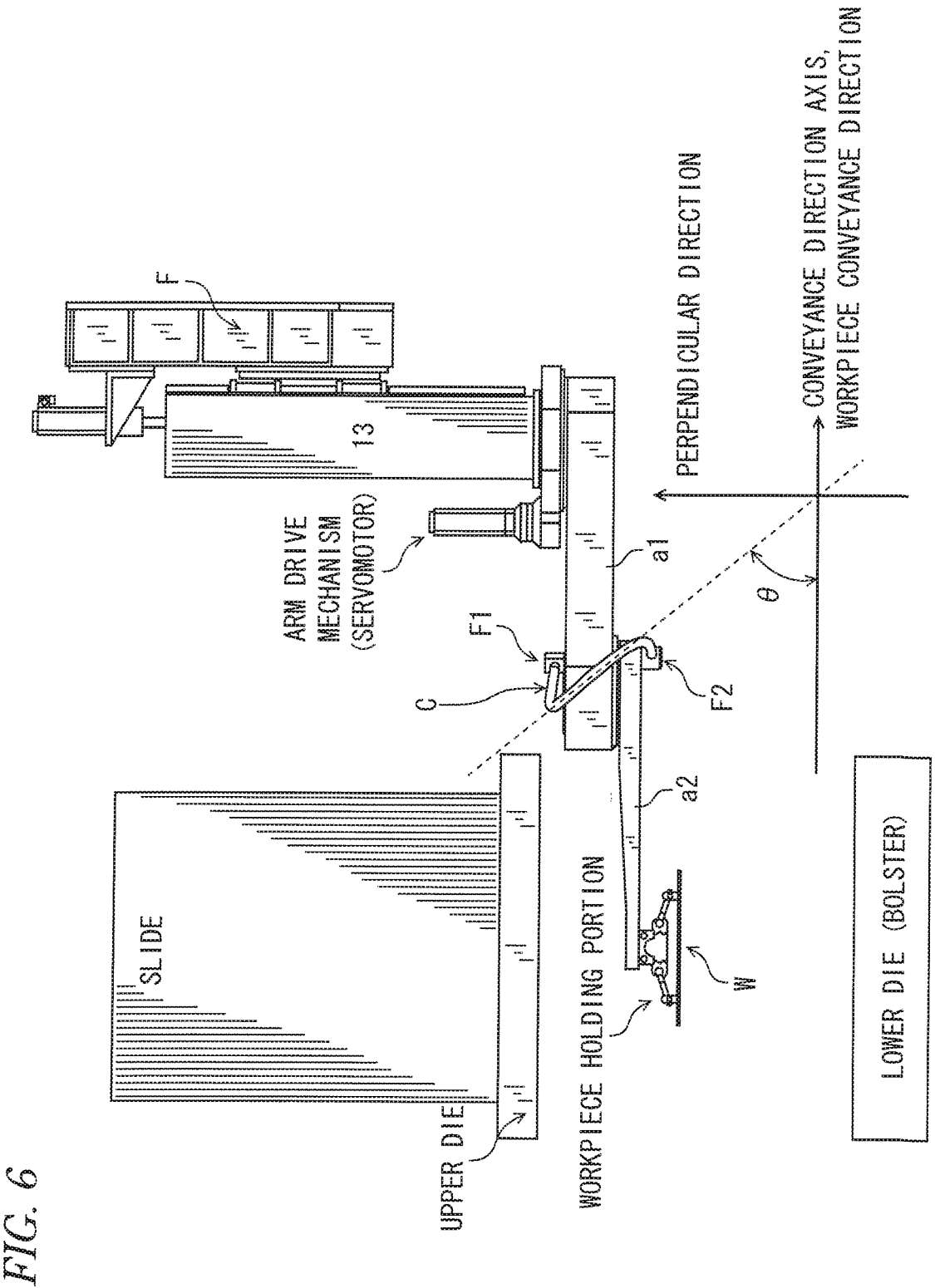
FIG. 6 is a side view for illustrating an inclination angle θ of a pipe or the like (wiring or the like) C in the extended state of the conveying arms of the workpiece conveying apparatus according to the embodiment (view as viewed in a workpiece-conveyance width direction).

Such pipe or the like C having a predetermined rigidity is not fixed between the first support portion F1 and the second support portion F2 by another member in the folded state in FIG. 3A to FIG. 3C, and is arranged so as to form a loop on the outer side of the second joint 10Y. Next, an extended state in which the first arm a1 and the second arm a2 are extended as viewed in the perpendicular direction (vertical direction) as illustrated in FIG. 1, FIG. 2A to FIG. 2C, FIG. 4A to FIG. 4D, FIG. 5A, FIG. 5B, or other drawings is described. This state corresponds to a state in which the center axis of the first arm a1 in the longitudinal direction and the center axis of the second arm a2 in the longitudinal direction cross each other as viewed in the perpendicular direction (vertical direction). In this extended state, the pipe or the like C is deformed into a helical shape at a pipe inclination angle $\theta$ as illustrated in FIG. 6 between the first support portion F1 and the second support portion F2 (see FIG. 4A to FIG. 4D, FIG. 5A, FIG. 5B, or other drawings). The expression "into a helical shape" encompasses the meaning "so as to form a part of a helical shape", and the same applies hereinafter. Further, an extension starting direction of the pipe or the like C from the first support portion F1 in the extended state is not substantially changed from an extension starting direction of the pipe or the like C from the first support portion F1 in the folded state. The same holds true for a relationship between the pipe or the like C and the second support portion F2.

That is, the pipe or the like C arranged so as to form a loop on the outer side of the second joint 10Y in the folded state of the conveying arms is fixed to the first arm a1 and the second arm a2 through intermediation of the first support portion F1 and the second support portion F2 so as to establish the relationship of the extension starting direction as described above. Therefore, as a holding angle (or nipping angle) α (see FIG. 5A and FIG. 5B) around the second joint 10Y between the first arm a1 and the second arm a2 is larger as in FIG. 2A to FIG. 2C, FIG. 4A to FIG. 4D, FIG. 5A, FIG. 5B, or other drawings from the folded state of the first arm a1 and the second arm a2 in FIG. 3A to FIG. 3C, the pipe or the like C is gradually twisted to be deformed into a helical shape.

When the pipe or the like C is deformed into a helical shape as described above, through the deformation, the pipe or the like C between the first support portion F1 and the second support portion F2 is increased in rigidity against a force generated along the workpiece conveyance direction. Therefore, even in a case in which the first arm a1 and the second arm a2 are bent and stretched to cause acceleration (acceleration/deceleration) when the workpiece holding device 3 is caused to perform a reciprocating motion for workpiece conveyance, the pipe or the like C can resist against an inertia force or an excitation force generated based on the acceleration. As a result, as in the related art, occurrence of a phenomenon in which the pipe or the like C swings on the outer side of the second joint 10Y can be prevented.

That is, according to a laying (wiring) method for the pipe or the like C in this embodiment, it is possible to provide a workpiece conveying apparatus for a pressing machine, which is capable of preventing occurrence of breakage or the like of the pipe or the like in the joint part (elbow joint) of the arm units with an extremely simple and low-cost configuration, and hence is low in cost and highly reliable.

Now, a specific example of a conveyance operation for a workpiece to be performed by the workpiece conveying apparatus according to this embodiment is described below.

(1) Extended State S0 to Folded State S2 (Carrying Out of Workpiece from Upstream Press Machine P1)

Figure 7A:
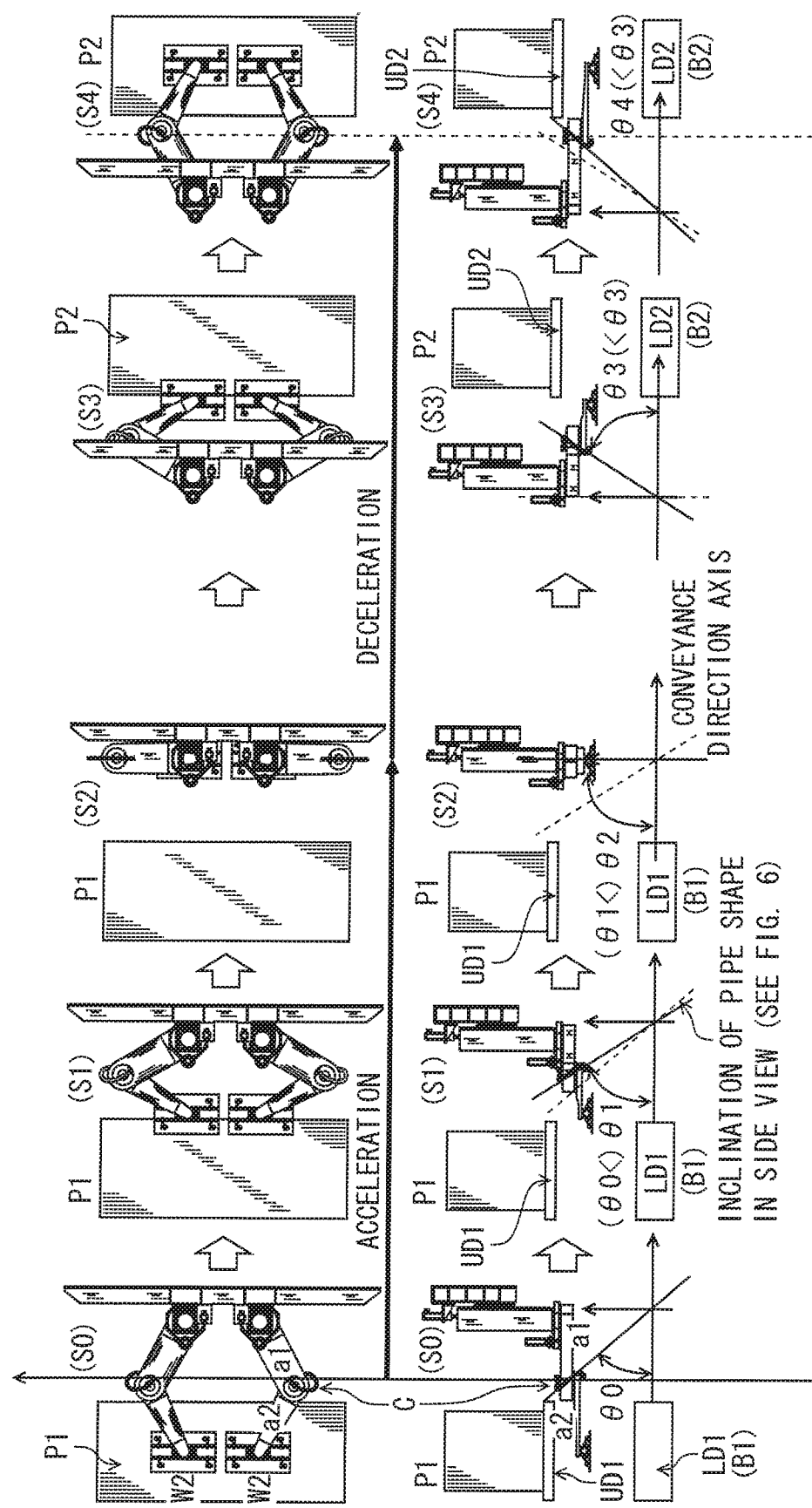
FIG. 7A is a view for illustrating a state of a workpiece conveyance operation in a chronological order in the workpiece conveying apparatus according to the embodiment.

In the operation of the conveying arms from the state S0 to the state S1 illustrated in FIG. 7A, immediately after start of the operation, the acceleration of the second joint 10Y is increased up to a set upper limit value in a short period of time (period T1 in FIG. 7B) while considering prevention of occurrence of jerk (such as acceleration vibration). After that, while causing the acceleration in a direction toward the downstream press machine P2, the magnitude of the acceleration is gradually reduced (period T2 in FIG. 7B), and the acceleration is set to zero at the state S2 (intermediate point).

While the conveying arms are accelerated under such acceleration control from the state S0 to the state S2 (the first arm a1 and the second arm a2 are turned about the first joint 10X and the second joint 10Y), the workpieces W1 and W2 are conveyed.

(2) Folded State S2 to Extended State S4 (Carrying Workpiece into Downstream Press Machine P2)

Figure 7B:
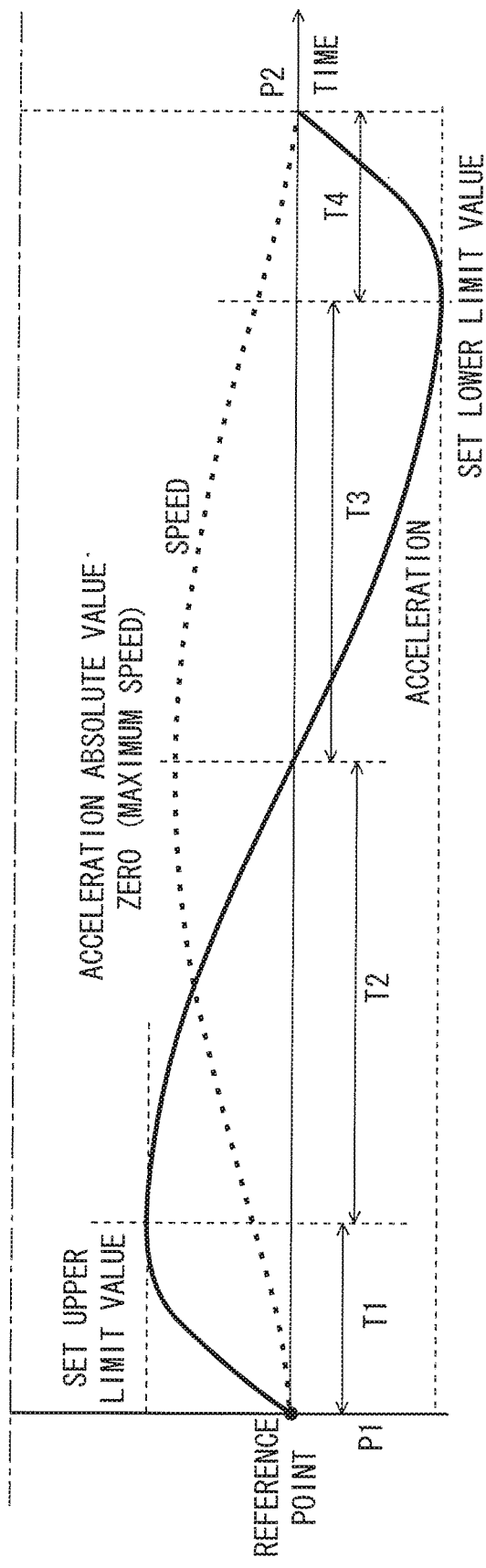
FIG. 7B is a time chart for illustrating acceleration (second joint part) caused in accordance with the chronological state change of FIG. 7A.

The acceleration that becomes zero at the state S2 is then caused while an absolute value thereof is gradually increased up to a set lower limit value in a direction opposite to that of the acceleration caused in the periods T1 and T2 (period T3 in FIG. 7B). Then, along with approach to the downstream press machine P2, the acceleration is again reduced in a short period of time (period T4 in FIG. 7B) while considering prevention of occurrence of jerk, and becomes zero at the state S4.

While the conveying arms are decelerated under such acceleration control from the state S2 to the state S4, the workpieces W1 and W2 are conveyed.

<State S0> (see FIG. 7A)

The pipe or the like C having one end fixed to the first arm a1 through intermediation of the first support portion F1 and another end fixed to the second arm a2 through the second support portion F2 is brought into a state of having a helical shape (see FIG. 4A to FIG. 4D, FIG. 5A, FIG. 5B, or other drawings) through an extension operation of the first arm a1 and the second arm a2. At this time, a helical shape part of the pipe or the like C as viewed from a lateral side is in a mode of being inclined with respect to a conveyance direction axis, and a pipe inclination angle given at this time is represented by θ0. In the state S0, the acceleration that may generate an inertia force, an excitation force, or the like has not been caused yet, and hence the pipe or the like C does not swing.

<State S0 to State S1> (see FIG. 7A)

The workpiece conveyance is started while the first arm a1 and the second arm a2 are folded from the state S0. The acceleration is once increased in a short period of time, and, after that, the magnitude is gradually reduced (period T1 and first half of period T2 in FIG. 7B).

The operation of the conveying arms is controlled so as to gradually increase the speed during a period in which the acceleration is increased in a short period of time, and, during that period, the pipe or the like C is deformed so that the helical shape part thereof is slowly eliminated. That is, during a period in which the acceleration of the second joint 10Y is increased (period T1), the pipe inclination angle is merely increased slightly from θ0 to θ1, and hence the pipe or the like C maintains, with the helical shape part, a state of being likely to resist against an inertia force or an excitation force generated based on the acceleration (state in which the rigidity of the pipe or the like C is increased due to helical deformation).

After that, the first arm a1 and the second arm a2 are folded so that the pipe inclination angle is increased, but the acceleration of the second joint 10Y is gradually reduced. Thus, the pipe or the like C subsequently maintains the state of being likely to resist against an inertia force or an excitation force (such shape as to form a part of the helical shape) (first half of the period T2).

As described above, even when the acceleration for workpiece conveyance is caused, the pipe or the like C in the state of being deformed into a helical shape to be increased in rigidity is less liable to be affected by the acceleration, thereby preventing swing of the pipe or the like C about the second joint 10Y.

<State S2> (see FIG. 7A)

The first arm a1 and the second arm a2 are brought into the folded state (S2), and, along therewith, the helical shape part of the pipe or the like C is eliminated (initial state: the state in which stress caused by helical deformation does not occur in the pipe or the like C, and the rigidity of the pipe or the like C is not increased).

That is, the pipe inclination angle is further increased to approximately 90° (θ2). At this time, the speed of the conveying arms (second joint 10Y) becomes a maximum value, whereas the acceleration of the second joint 10Y is gradually reduced from the state S1 to become zero (last half of the period T2 in FIG. 7B). Therefore, the pipe or the like C is in a mode of being liable to be affected by the acceleration caused along the conveyance direction axis. However, the acceleration becomes zero, and hence swing of the pipe or the like C about the second joint 10Y is less liable to occur.

<State S2→State S3> (see FIG. 7A)

The first arm a1 and the second arm a2 are extended toward the downstream press machine P2 so that a helical shape part appears again in the pipe or the like C. The pipe inclination angle of the pipe or the like C in the state S3 is generated in a direction opposite to that in the state S1 across a perpendicular plane orthogonal to the workpiece conveyance direction.

That is, the pipe inclination angle is reduced from approximately 90° (θ2) to θ3. At this time, the speed of the conveying arms (second joint 10Y) is reduced from the maximum value, whereas acceleration in a direction opposite to that of the acceleration generated in the periods T1 and T2 is caused in the second joint 10Y. That is, the conveying arms are operated while being gradually decelerated (period T3 in FIG. 7B). However, meanwhile, the pipe inclination angle is reduced, and the pipe or the like C is deformed into a helical shape, thereby increasing the rigidity of the pipe or the like C against the workpiece conveyance direction. As a result, the pipe or the like C is in a state of sufficiently resisting against an inertia force or an excitation force generated based on the acceleration. Therefore, swing of the pipe or the like C about the second joint 10Y is subsequently prevented.

<State S3→State S4> (see FIG. 7A)

The first arm a1 and the second arm a2 are further extended so that the pipe inclination angle is reduced from θ3 at the state S3 to θ4. Meanwhile, the absolute value of the acceleration of the conveying arms (second joint 10Y) is slightly increased up to the set lower limit value in a direction opposite to that of the acceleration caused during a period from the state S0 to the state S2, and, after that, is changed toward zero in a short period of time (last half of the period T3 to the period T4 in FIG. 7B).

That is, the acceleration is caused during this period, whereas the pipe inclination angle of the pipe or the like C tends to be reduced. Thus, the pipe or the like C is increased in rigidity due to helical deformation. As a result, the pipe or the like C can maintain a state of sufficiently resisting against an inertia force or an excitation force. Therefore, swing of the pipe or the lime C about the second joint 10Y is still prevented.

Further, at this time, a portion of the pipe or the like C, which is fixed to the second arm a2, is displaced so as to be away from an upper die UD2 mounted to a slide for the downstream press machine P2. Therefore, occurrence of an interference between the pipe or the like C and the upper die UD2 can be prevented at the time of carrying the workpiece into the press machine P2, and this structure is particularly advantageous in high-speed conveyance (see the state (S4) in FIG. 7A).

As described above, the pipe inclination angle becomes maximum (approximately 90°) in a state in which the pipe or the like C stands substantially perpendicularly on the outer side of the second joint 10Y (state S2 in FIG. 7A). In this state, no stress is applied to the pipe C, and hence the rigidity of the pipe or the like C itself is low. When acceleration is caused along the workpiece conveyance direction at this time, the pipe or the like C is liable to be affected by the acceleration. Thus, the pipe or the like C itself swings about the second joint 10Y in an acting direction of the acceleration. However, in the present invention, the acceleration becomes zero when the pipe inclination angle is maximum (at approximately 90°), and hence the pipe or the like C is less liable to be affected by the acceleration.

Meanwhile, in an interval (state) in which acceleration along the workpiece conveyance direction is caused in the second joint 10Y, the pipe or the like C is deformed into a helical shape. With this, the pipe inclination angle becomes smaller than 90°), and hence the pipe or the like C is in a mode of being capable of resisting against an inertia force or an excitation force generated based on the acceleration caused in the workpiece conveyance direction. That is, the rigidity of the pipe or the like C against the acceleration can be increased.

As described above, in this embodiment, only by contriving a fixing mode (laying mode) of the pipe or the like C with respect to the conveying arms (first arm a1, second arm a2, and second joint 10Y), in accordance with the magnitude of the acceleration caused along the workpiece conveyance direction, the pipe or the like C can be deformed into a mode of being likely to resist against an inertia force or an excitation force generated based on the acceleration (such shape as to form a part of the helical shape). Therefore, swing of the pipe or the like C about the second joint 10Y can be effectively prevented without particularly causing increase in cost.

That is, according to this embodiment, it is possible to provide a workpiece conveying apparatus for a pressing machine, which is capable of preventing occurrence of breakage or the like of the pipe or the like in a joint part (elbow joint) of the arm units with a relatively simple and low-cost configuration, and hence is low in cost and highly reliable.

In addition, in this embodiment, a fixation position of the pipe or the like C with respect to the second arm a2 is on a side opposite to the workpiece holding portion (workpiece holding device 3) with respect to the arm rotary shaft (or axis) (second joint 10Y). Thus, at the state S0 and the state S4 in FIG. 7B, the pipe or the like C is deformed in a direction of being away from each of the upstream press machine P1 and the downstream press machine P2. With this, interference (contact) of the pipe or the like C with the upper dies UD1 and UD2 mounted to the slides can be prevented, thereby being capable of contributing to high-speed conveyance of a workpiece.

Now, the laying (fixing) method for the pipe or the like C to the first arm a1 and the second arm a2 is described.

First Example (See FIG. 8)

Figure 8A:
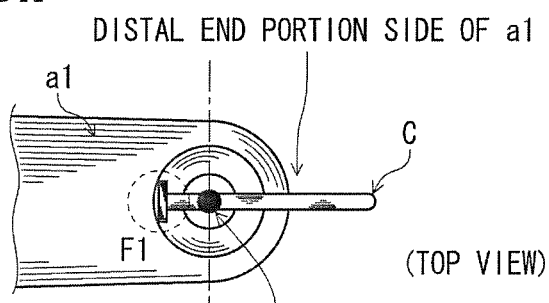
FIG. 8A is a top view for specifying an arranging (laying) method for the pipe or the like (wiring or the like) with respect to the conveying arms of the workpiece conveying apparatus according to the present invention.
Figure 8B:
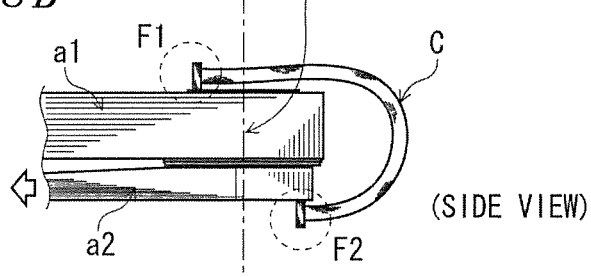
FIG. 8B is a side view of FIG. 8A.
Figure 8D:
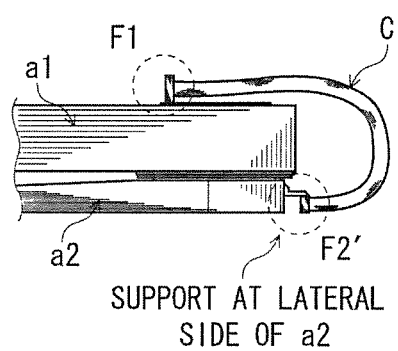
FIG. 8D is a side view for illustrating an example of another arranging (laying) example.
Figure 8C:
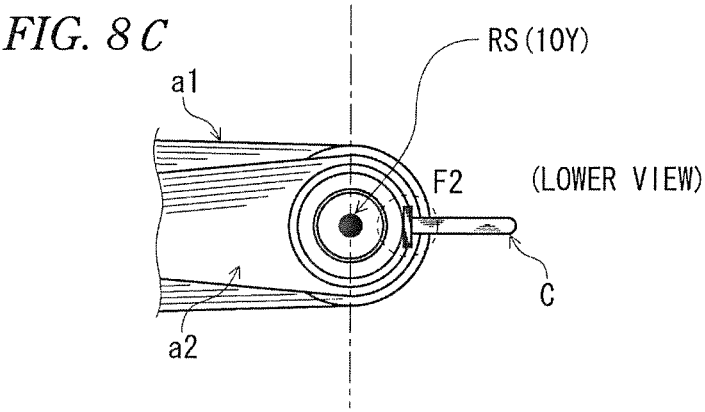
FIG. 8C is a lower view of FIG. 8A.

There may be employed a configuration as illustrated in FIG. 8A to FIG. 8C. Specifically, A. the pipe or the like C is supported by each of the first arm a1 and the second arm a2 (first support portion F1 and second support portion F2), B. in a case in which the pipe or the like C is extended from at least one of the first support portion F1 and the second support portion F2 to another thereof, C. in the folded state in which the first arm a1 and the second arm a2 are folded so as to overlap each other (state in which each arm is extended in a direction orthogonal to the workpiece conveyance direction: FIG. 3A to FIG. 3C and the state S2 in FIG. 7A), the pipe or the like C is arranged so as to intersect a reference plane (the term "reference plane" hereinafter also encompasses a perpendicular plane) S, which includes the arm coupling rotary shaft RS and is orthogonal to the extending direction of the center line of the first arm a1 (second arm a2) in the longitudinal direction (straight line connecting the first joint 10X and the second joint 10Y) when the first arm a1 and the second arm a2 are folded so as to overlap each other (in other words, the first support portion F1 and the second support portion F2 are arranged with the reference plane S therebetween), and D. the pipe or the like C can be fixed to the first arm a1 and the second arm a2 so that the pipe or the like C is deformed into an arc shape as viewed in a direction along the arm coupling rotary shaft RS (see FIG. 5B) when the first arm a1 and the second arm a2 are extended in the workpiece conveyance direction (states in FIG. 2A to FIG. 2C, FIG. 4A to FIG. 4D, FIG. 5A, FIG. 5B, or other drawings).

In FIG. 8A to FIG. 8C, illustration is given of an example in which the second support portion F2 is provided on the lower surface of the second arm a2. However, as exemplified in FIG. 8D, a second support portion F2' may be provided on a lateral side of the second arm a2. Further, the first support portion F1 and the second support portion F2 (F2') may be inverted upside down.

As described above, in a case in which the pipe or the like C is arranged so as to intersect the reference plane S in the folded state in which the first arm a1 and the second arm a2 are folded so as to overlap each other (FIG. 3A to FIG. 3C and the state S2 in FIG. 7A), when the first arm a1 and the second arm a2 are extended in the workpiece conveyance direction (states in FIG. 2A to FIG. 2C, FIG. 4A to FIG. 4D, FIG. 5A, FIG. 5B, or other drawings), the pipe or the like C is deformed into an arc shape as viewed in an direction along the arm coupling rotary shaft RS. As described above, in accordance with the magnitude of the acceleration caused along the workpiece conveyance direction, the pipe or the like C is deformed into such shape as to form a part of the helical shape. With this, the pipe or the like C is in a mode of being likely to resist against an inertia force or an excitation force generated based on the acceleration, thereby being capable of effectively preventing swing of the pipe or the like C about the second joint 10Y with the simple and low-cost configuration. As a result, occurrence of breakage or the like of wiring or the like at the joint part (elbow joint) of the conveying arms can be prevented.

Second Example (See FIG. 9)

Figure 9A:
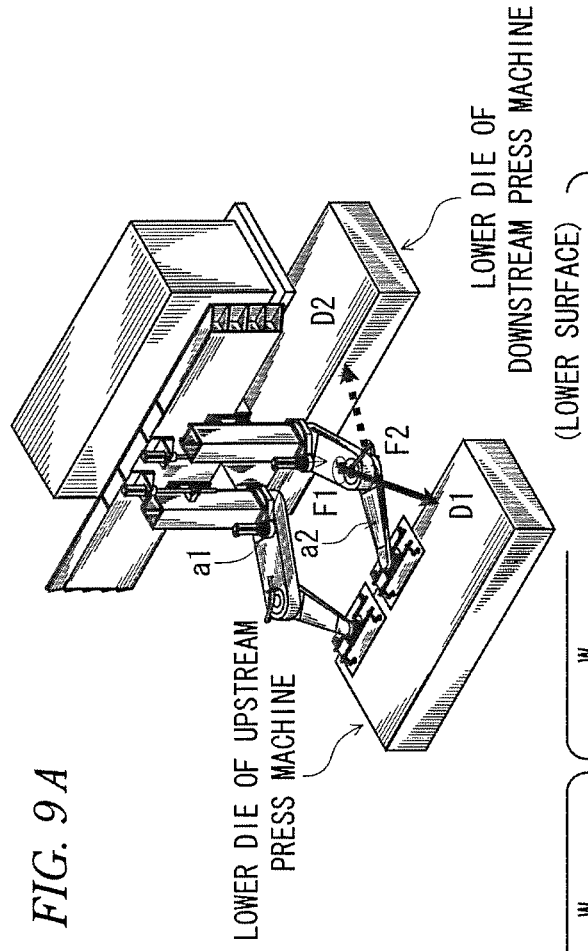
FIG. 9A is a perspective view for specifying an arranging (laying) method for the pipe or the like (wiring or the like) with respect to the conveying arms of the workpiece conveying apparatus according to the present invention from another angle.
Figure 9B:
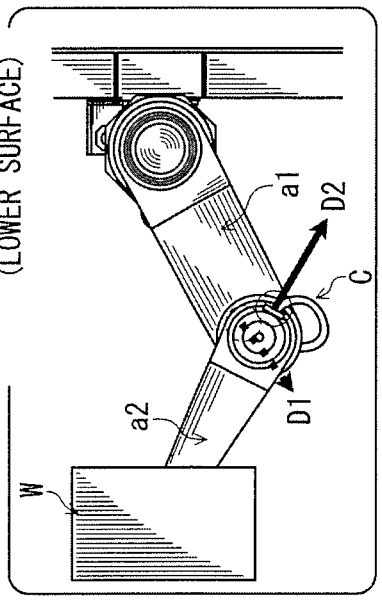
FIG. 9B is a top view of FIG. 9A.
Figure 9C:
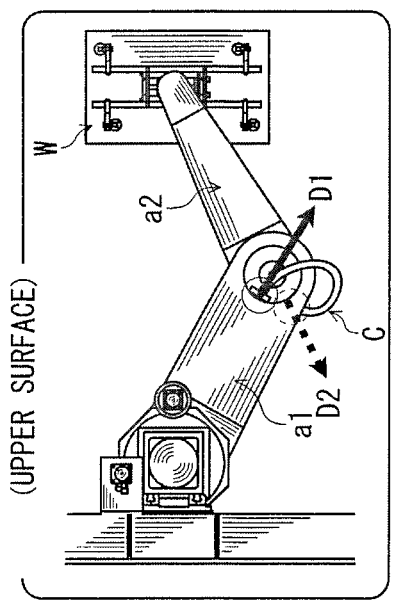
FIG. 9C is a lower view of FIG. 9A.

There may be employed a configuration as illustrated in FIG. 9A to FIG. 9C. Specifically, A. the pipe or the like C is supported by the first arm a1 and the second arm a2 (first support portion F1 and second support portion F2), B. in a case in which the pipe or the like C is extended from at least one of the first support portion F1 and the second support portion F2 to another thereof, E. when the center axis of the first arm at in the longitudinal direction intersects the center axis of the second arm a2 in the longitudinal direction, an extension starting direction D1 of the pipe or the like C at the first support portion F1 and an extension starting direction D2 of the pipe or the like C at the second support portion F2 intersect each other, and F. the extension starting directions D1 and D2 of the pipe or the like C are different from each other when the conveying arms are extended in the workpiece conveyance direction so that a helical shape part is formed in the pipe or the like C.

The above-mentioned extension starting direction D1 corresponds to a first extension starting direction in the present invention, and the above-mentioned extension starting direction D2 corresponds to a second extension starting direction in the present invention.

In FIG. 9A to FIG. 9C, illustration is given of an example in which the second support portion F2 is provided on the lower surface of the second arm a2. However, as exemplified in FIG. 8D, a second support portion F2' may be provided on a lateral side of the second arm a2. Further, the first support portion F1 and the second support portion F2 (F2') may be inverted upside down.

Also with such configuration, in accordance with the magnitude of the acceleration caused along the workpiece conveyance direction, the pipe or the like C is deformed into such shape as to form a part of the helical shape. With this, the pipe or the like C is in a mode of being likely to resist against an inertia force or an excitation force generated based on the acceleration, thereby being capable of effectively preventing swing of the pipe or the like C about the second joint 10Y with the simple and low-cost configuration. As a result, occurrence of breakage or the like of wiring or the like at the joint part (elbow joint) of the conveying arms can be prevented.

Third Example (See FIG. 10)

Figures 10A, 10B, 10C:
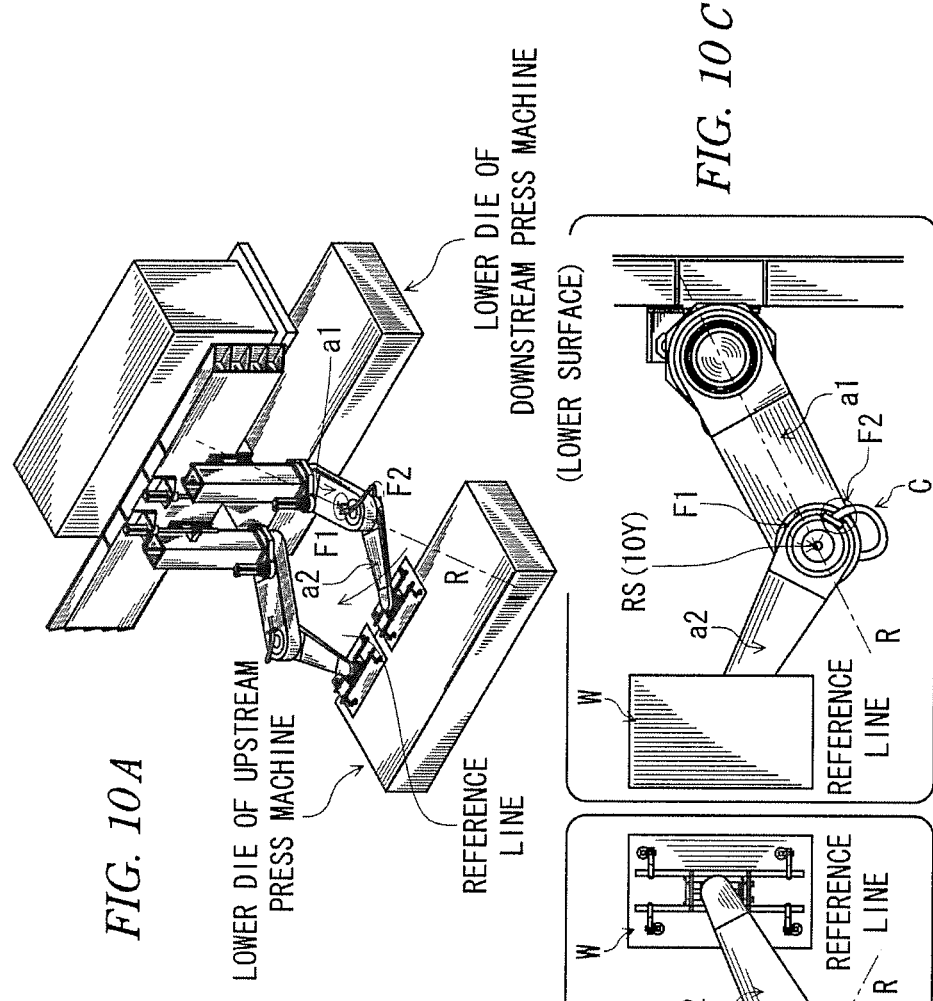
FIG. 10A is a perspective view for specifying an arranging (laying) method for the pipe or the like (wiring or the like) with respect to the conveying arms of the workpiece conveying apparatus according to the present invention from another angle.
FIG. 10B is a top view of FIG. 10A.
FIG. 10C is a lower view of FIG. 10A.

There may be employed a configuration as illustrated in FIG. 10A to FIG. 10C. Specifically, in addition to the configuration illustrated in the first example or the second example, with respect to the reference line R (corresponding to the center axis of the first arm in the longitudinal direction), which passes through the first support portion F1 for the pipe or the like C on the first arm a1 and is substantially parallel to the longitudinal direction of the first arm a1, the second support portion F2 for the pipe or the like C with respect to the second arm a2 is located on a side opposite to a side on which the second arm a2 is bent with respect to the first arm a1.

Figure 11:
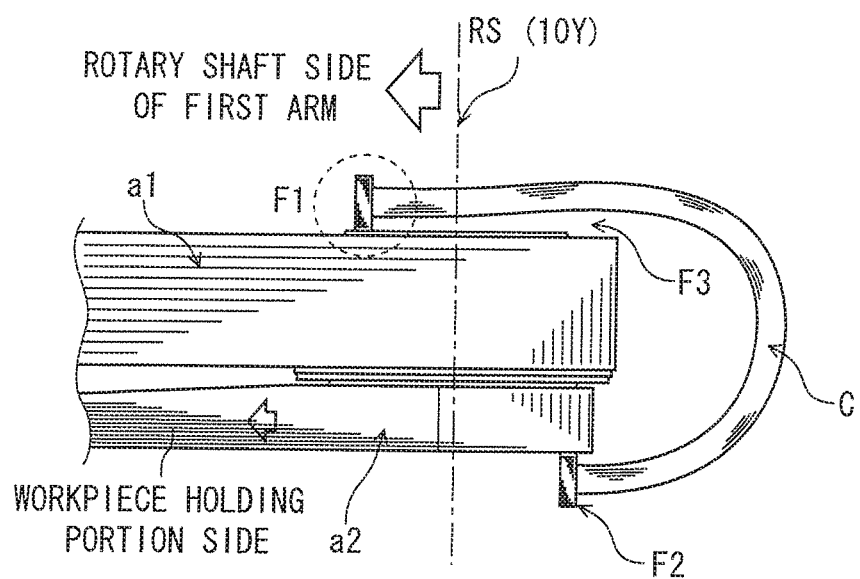
FIG. 11 is a side view for specifying an arranging (laying) method for the pipe or the like (wiring or the like) with respect to the conveying arms of the workpiece conveying apparatus according to the present invention from another angle.

Fourth Example (See FIG. 11)

There may be employed a configuration as illustrated in illustrated in FIG. 11. Specifically, in addition to the configuration illustrated in the first example or the second example, the first support portion F1 for the pipe or the like C on the first arm a1 is located on a turn shaft (first joint 10X) side of the first arm a1 with respect to the rotary shaft RS (second joint 10Y) at the coupling portion between the first arm a1 and the second arm a2.

With this, the pipe or the like C can be secured to have a desired length that allows deformation into a helical shape without involving excessive bending stress while being routed along the vicinities outer surfaces of the conveying arms between the first support portion F1 and the second support portion F2. That is, the length of the pipe or the like C is not secured more than necessary, and hence a burden on the pipe or the like C itself at the time of deformation into a helical shape is reduced while reducing a risk of an interference with peripheral machines.

In contrast, in a case in which the first support portion F1 is located on the side opposite to the turn shaft side of the first arm a1 with respect to the rotary shaft RS (for example, at a support portion F3 in FIG. 11), when the pipe or the like C is to be secured to have a desired length that allows deformation into a helical shape without involving excessive bending stress, the pipe or the like C is required to be routed so as to be separated away from the conveying arms. Such routing of the pipe or the like C leads to a risk of an interference with the peripheral machines or deflection of the pipe or the like C. Further, when the pipe or the like C is routed along the vicinities of the outer surfaces of the conveying arms between the support portion F3 and the first support portion F1, a length of the pipe or the like C, which is required for deformation into a helical mode, cannot be secured. Therefore, excessive bending stress is applied to the pipe or the like C at the time of deformation into a helical shape.

Figure 12:
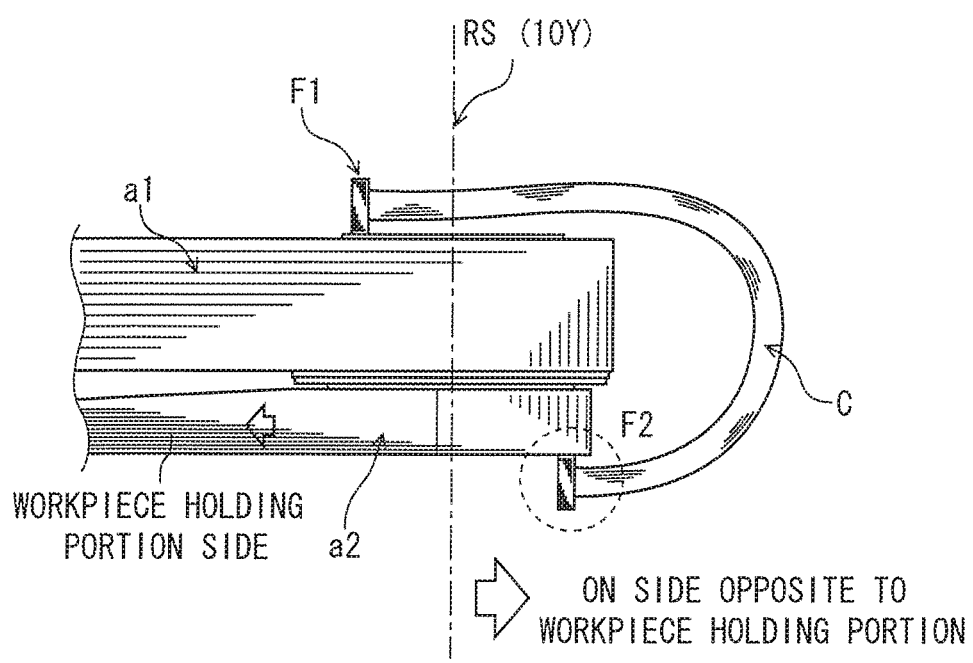
FIG. 12 is a side view for specifying an arranging (laying) method for the pipe or the like (wiring or the like) with respect to the conveying arms of the workpiece conveying apparatus according to the present invention from another angle.
Figure 13:
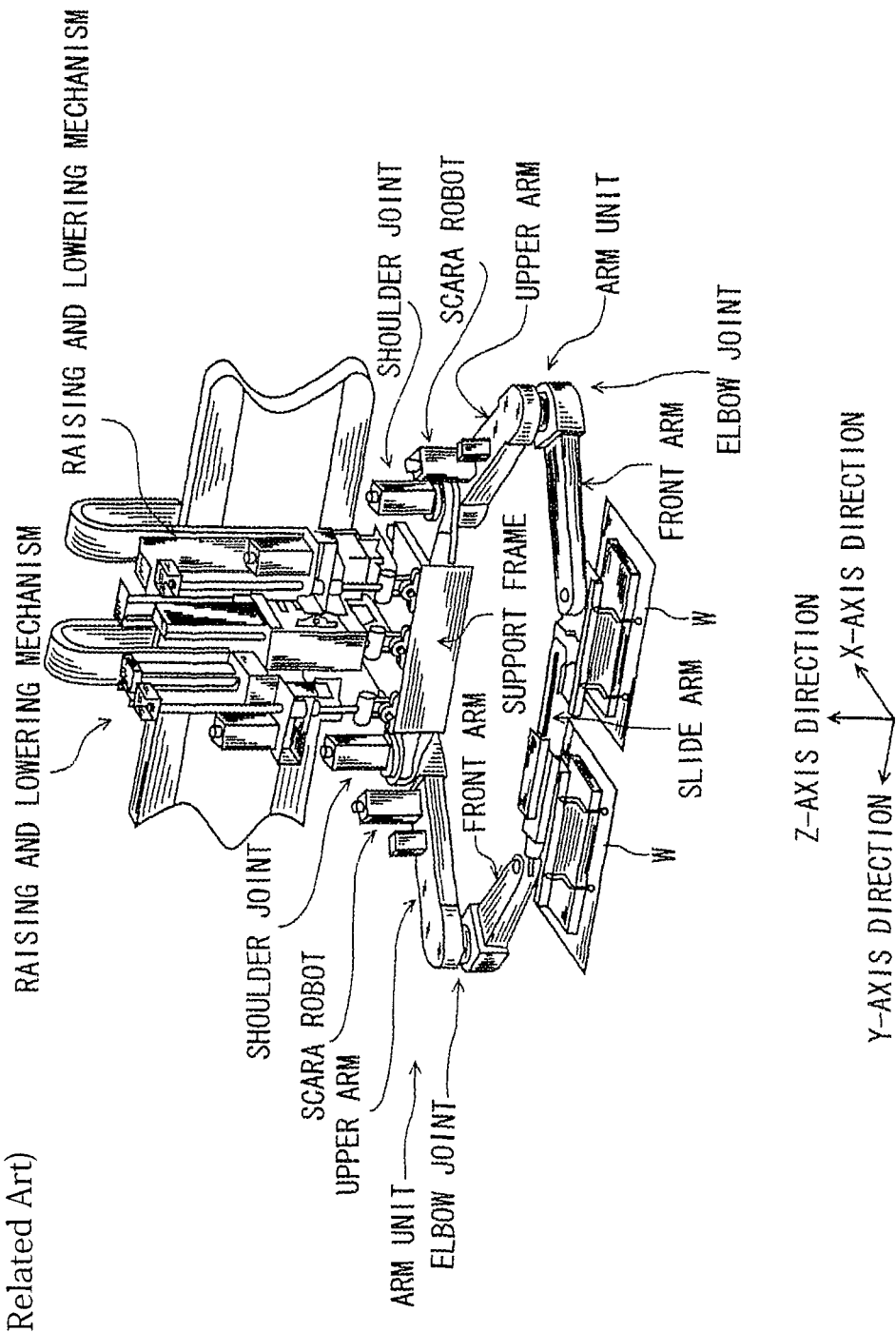
FIG. 13 is a perspective view for illustrating an example of a related-art workpiece conveying apparatus including arm units.
Figure 14:
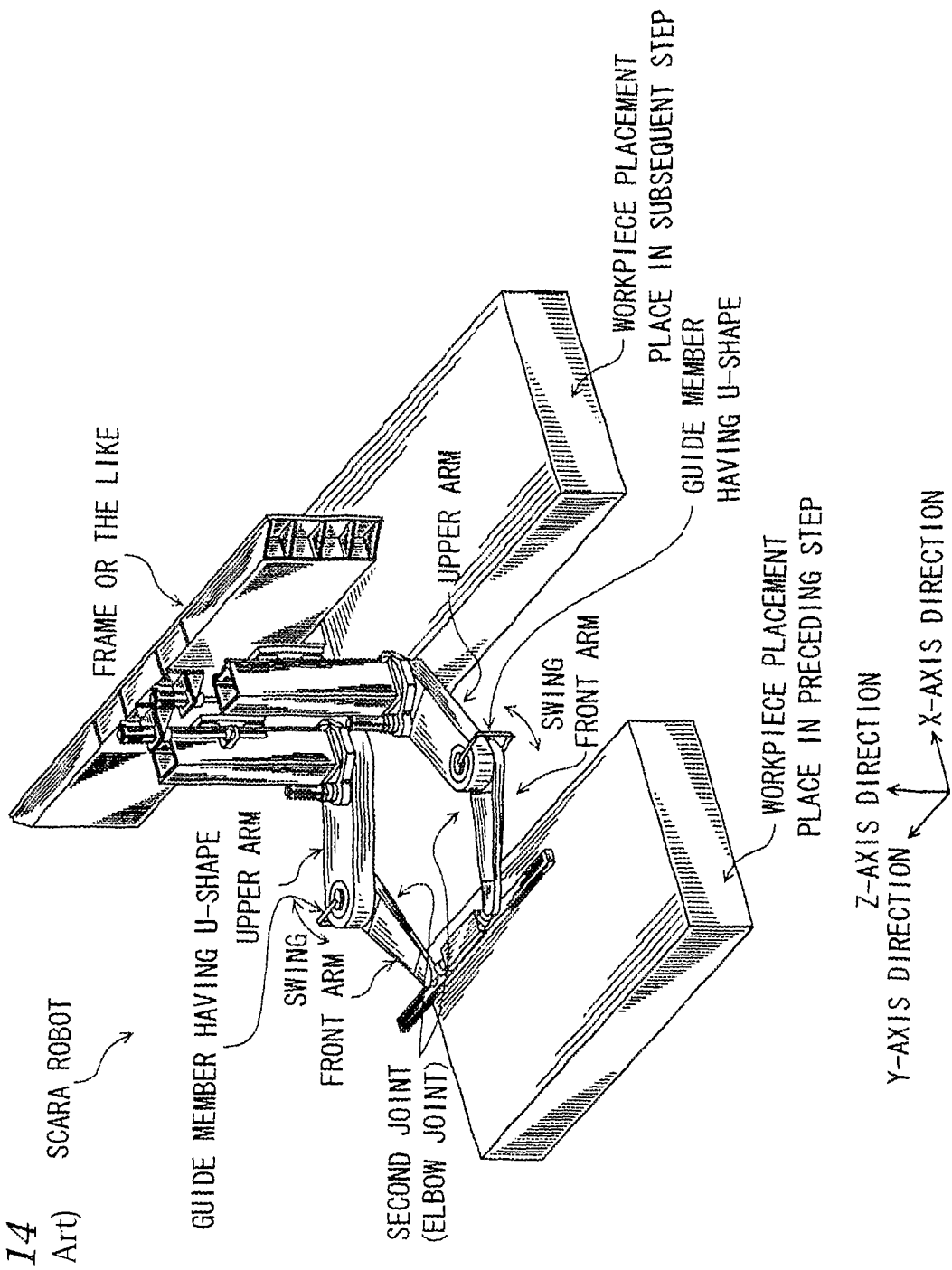
FIG. 14 is a perspective view for illustrating an example of a related-art workpiece conveying apparatus in which guide members each having a U-shape and being swingable are provided at a joint part of an arm unit.

Fifth Example (See FIG. 12)

There may be employed configuration as illustrated in illustrated in FIG. 12. Specifically, in addition to the configuration illustrated in the first example or the second example, the second support portion F2 for the pipe or the like C with respect to the second arm a2 is located on a side opposite to the workpiece holding portion with respect to the rotary shaft RS (second joint 10Y) at the coupling portion between the first arm a1 and the second arm a2.

With this, swing of the pipe or the like C can be prevented, and, in addition, downward deflection of the pipe or the like C due to the self-weight can be prevented. As a result, this configuration can contribute to reduction in risk of contact (interference) of the pipe or the like C with the upper and lower dies in the press machine.

In FIG. 11 and FIG. 12, illustration is given of an example in which the second support portion F2 is provided on the lower surface of the second arm a2. However, also in this example, as exemplified in FIG. 8D, a second support portion F2' may be provided on a lateral side of the second arm a2. Further, the first support portion F1 and the second support portion F2 (F2') may be inverted upside down.

Incidentally, the present invention may have a feature in the following configuration.

Specifically, the first support portion F1 and the second support portion F2 are different from each other in shortest distance to the rotary shaft RS (second joint 10Y), and when the first arm a1 and the second arm a2 are extended (the holding angle α is increased), the pipe or the like C is deformed into a helical shape.

That is, in this embodiment, there is exemplified the case in which, when the first arm a1 and the second arm a2 are in the folded state, the pipe or the like C supported by the first support portion F1 or the second support portion F2 is extended (routed) in the direction along the center axis of the first arm a1 or the second arm a2 in the longitudinal direction. However, the present invention is not limited thereto, and the pipe or the like C supported by the support portion F1 or F2 may be arranged in a mode of being routed in a direction of being intersected with the center axis of the first arm a1 or the second arm a2 in the longitudinal direction (direction oblique to the center axis of the first arm a1 or the second arm a2 in the longitudinal direction).

The various configuration examples are described in the above-mentioned embodiment. The present invention has a feature in the following configuration. Specifically, when the conveying arms are bent and stretched between the folded state and the extended state for workpiece conveyance, the pipe or the like C supported at one side thereof by the first arm a1 and supported at another side thereof by the second arm a2 is deformed utilizing change in holding angle α between the first arm a1 and the second arm a2 so that the pipe or the like C can resist against an inertia force or an excitation force generated based on the acceleration at the time of the workpiece conveyance, thereby preventing swing of the pipe or the like C about the second joint (elbow joint). The specific configuration examples for achieving the feature is exemplified in the above-mentioned embodiment.

As described above, according to this embodiment, it is possible to provide a workpiece conveying apparatus for a pressing machine including arm units (first arm and second arm) each being swingable within a substantially horizontal plane, which is capable of preventing occurrence of breakage or the like of the pipe or the like in a joint part (elbow joint) with a relatively simple and low-cost configuration, and hence is low in cost and highly reliable.

In this embodiment, there is exemplified the case in which the first support portion F1 and the second support portion F2 are arranged on the center axes of the first arm a1 and the second arm a2 in the longitudinal direction as viewed in the vertical direction. However, the present invention is not limited thereto, and is applicable to a case in which the first support portion F1 and the second support portion F2 may be offset in a lateral direction from the center axes in the longitudinal direction of the first arm a1 and the second arm a2 as viewed in the vertical direction.

Further, also with such offset, when the conveying arms are bent and stretched, the pipe or the like C can be deformed into a helical shape with the change in holding angle α between the first arm a1 and the second arm a2, thereby obtaining the above-mentioned various actions and effects.

Further, in this embodiment, the case of the configuration including the arm unit 10A and the arm unit 10B that are arranged so as to be opposed to each other is described. However, the present invention is applicable to a workpiece conveying apparatus including only one of the arm unit 10A and the arm unit 10B.

As described above, according to this embodiment, it is possible to provide a workpiece conveying apparatus for a pressing machine including arm units (first arm (upper arm) and second arm (front arm)) each being swingable within a substantially horizontal plane, which is capable of preventing occurrence of breakage or the like of the pipe or the like in a joint part (elbow joint) of the arm units with a relatively simple and low-cost configuration, and hence is low in cost and highly reliable.

The embodiment described above is merely an example for describing the present invention, and various modifications may be made without departing from the gist of the present invention.

What is claimed is:

1. A workpiece conveying apparatus for a pressing machine, comprising an arm unit including:

a first arm supported at a proximal end side thereof through intermediation of a first joint so as to be freely rotatable within a substantially horizontal plane;

a second arm supported at a proximal end side thereof on a distal end side of the first arm through intermediation of a second joint so as to be freely rotatable within the substantially horizontal plane;

a workpiece holder, which is provided on a distal end side of the second arm, and is configured to hold a workpiece;

a first arm drive mechanism configured to drive the first arm to rotate about the first joint; and a second arm drive mechanism configured to drive the second arm to rotate about the second joint with respect to the first arm, wherein one of a pipe and a wiring arranged on an outer side of the second joint is supported at one side thereof by the first arm through intermediation of a first support portion, and is supported at another side thereof by the second arm through intermediation of a second support portion, wherein the first support portion and the second support portion are different from each other in shortest distance to the second joint, and wherein, as a holding angle between the first arm and the second arm is increased, the one of the pipe and the wiring is deformed so as to form a part of a helical shape.

2. A workpiece conveying apparatus for a pressing machine according to claim 1, wherein, with respect to a reference line R that passes through the first support portion and is substantially parallel to a longitudinal direction of the first arm, the second support portion is located on a side opposite to a side on which the second arm is bent with respect to the first arm.

3. A workpiece conveying apparatus for a pressing machine according to claim 1, wherein the first support portion is arranged so as to be located on a turn shaft side of the first joint on the proximal end side of the first arm with respect to a rotary shaft of the second joint coupling the first arm and the second arm.

4. A workpiece conveying apparatus for a pressing machine according to claim 1, wherein the second support portion is arranged so as to be located on a side opposite to the workpiece holder with respect to a rotary shaft of the second joint coupling the first arm and the second arm.

5. A workpiece conveying apparatus for a pressing machine, comprising an arm unit including:

a first arm supported at a proximal end side thereof through intermediation of a first joint so as to be freely rotatable within a substantially horizontal plane;

a second arm supported at a proximal end side thereof on a distal end side of the first arm through intermediation of a second joint so as to be freely rotatable within the substantially horizontal plane;

a workpiece holder, which is provided on a distal end side of the second arm, and is configured to hold a workpiece;

a first arm drive mechanism configured to drive the first arm to rotate about the first joint; and a second arm drive mechanism configured to drive the second arm to rotate about the second joint with respect to the first arm, wherein one of a pipe and a wiring arranged on an outer side of the second joint is supported at one side thereof by the first arm through intermediation of a first support portion, and is supported at another side thereof by the second arm through intermediation of a second support portion, wherein, in a case in which the one of the pipe and the wiring is extended from at least one of the first support portion and the second support portion to another of the first support portion and the second support portion, in a folded state in which the first arm and the second arm are folded so as to overlap each other, the one of the pipe and the wiring is arranged so as to intersect a vertical plane, which includes a rotary shaft of the second joint and is orthogonal to an extending direction of a center line of the first arm in a longitudinal direction in the folded state, and wherein the one of the pipe and the wiring is arranged so that the one of the pipe and the wiring is deformed into an arc shape as viewed in a direction along the rotary shaft of the second joint when the first arm and the second arm are extended in a workpiece conveyance direction.

6. A workpiece conveying apparatus for a pressing machine according to claim 5, wherein, with respect to a reference line R that passes through the first support portion and is substantially parallel to a longitudinal direction of the first arm, the second support portion is located on a side opposite to a side on which the second arm is bent with respect to the first arm.

7. A workpiece conveying apparatus for a pressing machine according to claim 5, wherein the first support portion is arranged so as to be located on a turn shaft side of the first joint on the proximal end side of the first arm with respect to the rotary shaft of the second joint coupling the first arm and the second arm.

8. A workpiece conveying apparatus for a pressing machine according to claim 5, wherein the second support portion is arranged so as to be located on a side opposite to the workpiece holder with respect to the rotary shaft of the second joint coupling the first arm and the second arm.

9. A workpiece conveying apparatus for a pressing machine, comprising an arm unit including:

a first arm supported at a proximal end side thereof through intermediation of a first joint so as to be freely rotatable within a substantially horizontal plane;

a second arm supported at a proximal end side thereof on a distal end side of the first arm through intermediation of a second joint so as to be freely rotatable within the substantially horizontal plane;

a workpiece holder, which is provided on a distal end side of the second arm, and is configured to hold a workpiece;

a first arm drive mechanism configured to drive the first arm to rotate about the first joint; and a second arm drive mechanism configured to drive the second arm to rotate about the second joint with respect to the first arm, wherein one of a pipe and a wiring arranged on an outer side of the second joint is supported at one side thereof by the first arm through intermediation of a first support portion, and is supported at another side thereof by the second arm through intermediation of a second support portion, wherein, in a case in which the one of the pipe and the wiring is extended from at least one of the first support portion and the second support portion to another of the first support portion and the second support portion, when a center axis of the first arm in a longitudinal direction intersects a center axis of the second arm in the longitudinal direction, a first extension starting direction of the one of the pipe and the wiring at the first support portion and a second extension starting direction of the one of the pipe and the wiring at the second support portion intersect each other, and wherein the one of the pipe and the wiring is arranged so that the first extension starting direction and the second extension starting direction of the one of the pipe and the wiring are different from each other when the first arm and the second arm are extended in a workpiece conveyance direction so as to form a helical shape in the one of the pipe and the wiring.

10. A workpiece conveying apparatus for a pressing machine according to claim 9, wherein, with respect to a reference line R that passes through the first support portion and is substantially parallel to a longitudinal direction of the first arm, the second support portion is located on a side opposite to a side on which the second arm is bent with respect to the first arm.

11. A workpiece conveying apparatus for a pressing machine according to claim 9, wherein the first support portion is arranged so as to be located on a turn shaft side of the first joint on the proximal end side of the first arm with respect to a rotary shaft of the second joint coupling the first arm and the second arm.

12. A workpiece conveying apparatus for a pressing machine according to claim 9, wherein the second support portion is arranged so as to be located on a side opposite to the workpiece holder with respect to a rotary shaft of the second joint coupling the first arm and the second arm.

* * * * *